(12) United States Patent
Koizumi

(10) Patent No.: US 7,061,459 B2
(45) Date of Patent: Jun. 13, 2006

(54) DISPLAY CONTROLLER, DISPLAY UNIT AND ELECTRONIC APPARATUS

(75) Inventor: Norio Koizumi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 555 days.

(21) Appl. No.: 10/140,833

(22) Filed: May 9, 2002

(65) Prior Publication Data

US 2002/0186213 A1    Dec. 12, 2002

(30) Foreign Application Priority Data

May 11, 2001    (JP)    ............................. 2001-141997

(51) Int. Cl.
*G09G 3/36*    (2006.01)
(52) U.S. Cl. ....................... 345/94; 345/213
(58) Field of Classification Search .......... 345/87–103, 345/213, 45–50; 348/383, 793, 795–797, 348/804; G09G 3/36; H04N 5/66

See application file for complete search history.

(56) References Cited

U.S. PATENT DOCUMENTS

| | | | | |
|---|---|---|---|---|
| 4,121,256 A | * | 10/1978 | Lorteije et al. | ............. 348/797 |
| 4,148,070 A | * | 4/1979 | Taylor | ......................... 348/719 |
| 5,243,447 A | * | 9/1993 | Bodenkamp et al. | ........ 345/629 |
| 6,531,911 B1 | * | 3/2003 | Hsu et al. | .................... 327/512 |

FOREIGN PATENT DOCUMENTS

| | | | |
|---|---|---|---|
| JP | 62013174 A | * | 1/1987 |
| JP | 08069330 A | * | 3/1996 |
| JP | A 09-305147 | | 11/1997 |

OTHER PUBLICATIONS

U.S. Appl. No. 09/911,409, filed Jul. 25, 2001, Tsuyoshi Tamura.
U.S. Appl. No. 09/911,829, filed Jul. 25, 2001, Tsuyoshi Tamura.

* cited by examiner

*Primary Examiner*—Alexander Eisen
(74) *Attorney, Agent, or Firm*—Oliff & Berridge, PLC

(57) ABSTRACT

The invention provides display controllers, display units and electronic apparatuses using the same, which can achieve transfer rates that can accommodate increases in the amount of display data that may result from increases in the screen size of liquid crystal panels in the future with low power consumption. The display unit includes a liquid crystal panel (display section), a display data RAM that stores display data for at least one frame, an X driver IC (display controller) that display-drives the liquid crystal panel at a given frame cycle, and a Y driver IC that scan-drives the liquid crystal panel. Display data is supplied from the MPU to the X driver IC through a differential IF. The MPU supplies display data at a high-speed transfer rate with the differential IF, using a dummy blanking period, and stops the operation of the differential IF until the next display data transfer timing.

10 Claims, 17 Drawing Sheets

DISPLAY CONTROLLER, DISPLAY UNIT AND ELECTRONIC APPARATUS

BACKGROUND OF THE INVENTION

1. Field of Invention

The present invention relates to display controllers, display units and electronic apparatuses using the same.

2. Description of Related Art

Due to recent developments in communication technology and mounting technology, characters, such as numbers and letters, as well as a variety of data that are highly informative to users, such as still pictures and moving pictures, can be displayed on display sections of mobile type electronic apparatuses. A variety of data formats have been proposed for data that are displayed on such electronic apparatuses. For example, in the case of mobile telephones, a technology that receives or transfers display data that is compressed and coded by the MPEG (Moving Picture Experts Group) standard has been proposed.

In this case, a mobile telephone may be equipped with a liquid crystal panel as its display section, for example. The liquid crystal panel is display-driven with a display controller based on display data corresponding to a moving picture or a still picture.

However, in order to display a moving picture on the liquid crystal panel without causing a feeling of physical disorder, display data needs to be supplied at a high-speed transfer rate to the display controller that drives the liquid crystal panel.

Such transfer of display data has been performed by an interface formed from a CMOS (Complimentary Metal Oxide Semiconductor) circuit that can be realized at a low cost. However, in the CMOS circuit, its current consumption increases in proportion to frequencies. Therefore, where a transfer rate that is required to display moving pictures without causing a feeling of physical disorder is realized, the battery run time of a mobile electronic apparatus, such as a mobile telephone, becomes short. Also, interfaces formed from CMOS circuits would make it difficult to realize transfer rates that can accommodate increases in the screen size of liquid crystal panels and increases in the number of gradation bits in the future.

SUMMARY OF THE INVENTION

The present invention addresses the technical problems described above, and its object is to provide display controllers, and display units and electronic apparatuses using the same, which can achieve transfer rates that can accommodate increases in the amount of display data that may result from increases in the screen size of liquid crystal panels in the future with low power consumption.

To address or solve the problems described above, the present invention provides a display controller that display-drives a display section based on display data. The display controller includes: a storage device that stores display data for at least one frame; a first display data receiving device that receives display data to be written in the storage device during a dummy blanking period provided prior to a start of scanning at the display section; a display data writing device that writes the display data received by the first display data receiving device in the storage device during the dummy blanking period; and a display driving device that display-drives the display section based on the display data read from the storage device.

The display data is, for example, moving picture data, still picture data, and data that are required to display-drive a display section with display control signals for the picture data.

In accordance with the present invention, in the display controller having the storage device that stores display data for one frame, and the display section is display-driven based on the display data stored in the storage device, display data to be written in the storage device is received during a dummy blanking period provided prior to a start of scanning at the display section and the same is successively written in the storage device. By doing so, display data for a picture to be displayed in each frame can be received quickly, and written in the storage device. Therefore, even where the amount of display data increases with increases in the screen size of display sections and increases in the number of gradation bits, transfer time required to transfer thereof can be secured.

Also, in the present invention, the display data writing device writes display data corresponding to a given scanning line in the storage device, before the display data corresponding to a given scanning line in the frame is read from the storage device.

In accordance with the present invention, where a display driving is conducted in a unit of given scanning lines in the frame, before display data for the scanning lines is read out, the display data corresponding thereto in the frame is written in the storage device. Accordingly, this can avoid a phenomenon in which a moving picture displayed causes a feeling of physical disorder because display data for a previous frame is displayed in a frame where display data is renewed.

Also, in accordance with the present invention, the dummy blanking period is provided before a vertical scanning in the display section starts, and the first display data receiving device receives display data for one frame for the frame during the dummy blanking period.

In accordance with the present invention, the dummy blanking period is provided before a vertical scanning in the display section starts, and display data for one frame for the frame is received during the dummy blanking period. By doing so, when scanning of a first scanning line is started, display data corresponding to the scanning line has been written in the storage device, and writing in and reading from the storage device do not simultaneously take place as far as each scanning line in the frame is concerned, such that generation of timings can be simplified.

Also, in accordance with the present invention, where an amount of display data for one frame is defined as D, and a transfer data rate of display data to be received by the first display data receiving device is defined as R, the dummy blanking period is only provided for a period that is represented by D/R.

In the present invention, since the dummy blanking period is only provided for a period (D/R) of transferring display data for at least one frame, when scanning of the first scanning line is started, display data for one frame is written in the storage device. Accordingly, where a display drive is conducted for scanning lines after the first scanning line, writing in and reading from the storage device do not simultaneously take place. This can reduce a current change within the storage device, which may be caused by simultaneous writing and reading. As a result, an anti-noise characteristic of the storage device can be enhanced.

Also, in accordance with the present invention, the dummy blanking period is provided before a horizontal scanning in the display section starts, and the first display data receiving device receives display data for the scanning line during the dummy blanking period.

In accordance with the present invention, the dummy blanking period is provided before scanning of each horizontal scanning line in the display section starts, and display data for the scanning line is received during the dummy blanking period provided before each horizontal scanning starts. By doing so, when scanning of each scanning line is started, display data corresponding to the scanning line has been written in the storage device, and writing in and reading from the storage device do not simultaneously take place, such that generation of timings can be simplified.

Also, the present invention includes a receiving operation stopping device that stops an operation of the first display data receiving device during a given period from a completion of reception of display data by the first display data receiving device until the next display data is received.

The period from a completion of reception of display data by the first display data receiving device until the next display data is received depends on transfer timings of display data. For example, where display data is received at each of the scanning lines, it means a period until the next display data is received. Where display data is received at each of the frames, it means a period until display data is received in the next frame. Where display data is received while skipping a given number of frames, it means a period until display data is received in a frame next to the skipped given number of frames.

In the present invention, display data is received during a dummy blanking period, and the data receiving operation is only stopped during a given period from the completion of reception until the next reception of display data, as described above. By doing so, reception of required display data is started earlier, and the receiving operation is stopped earlier when the reception is completed, whereby the power consumption can be reduced.

Also, in accordance with the present invention, the first display data receiving device includes a differential amplifier that amplifies a differential signal of display data received through signal lines of a differential pair, and the receiving operation stopping device stops the operation of the differential amplifier during a period after display data received by the first display data receiving device is written in the storage device until the next display data is received.

In the present invention, display data received through the signal lines of the differential pair is received by the differential amplifier, and the operation of the differential amplifier is stopped during a period after the display data is written in the storage device until the next display data is received. By doing so, current consumption can be reduced by stopping the operation of the differential amplifier during a period in which display data is not received.

Also, in accordance with the present invention, the first display data receiving device includes a differential amplifier that amplifies a differential signal of display data received through signal lines of a differential pair, and the receiving operation stopping device stops or limits current of a current source of the differential amplifier during a period after display data received by the first display data receiving device is written in the storage device until the next display data is received.

In the present invention, display data received through the signal lines of the differential pair is received by the differential amplifier, and the current of the current source of the differential amplifier is stopped or limited during a period after the display data is written in the storage device until the next display data is received. By doing so, current consumption can be reduced by stopping the operation of the differential amplifier during a period in which display data is not received.

Also, the present invention provides a display controller that display-drives a display section based on display data. The display controller includes: a storage device that stores display data for at least one frame; a first display data receiving device that receives display data with a bit width K; a first bit width conversion device that converts display data with the bit width K received by the first display data receiving device to data with a bit width L; a second display data receiving device that receives display data through a parallel bus with a bit width N; a second bit width conversion device that converts display data with the bit width N received by the second display data receiving device to data with a bit width L; a display data writing device that writes the display data with the bit width L converted by the first or second bit width conversion device in the storage device; and a display driving device that display-drives the display section based on the display data read from the storage device.

The present invention is structured such that the bit width of at least display data received through the parallel bus is expanded, and the display data is written in the storage device in a unit of the bit width. By doing so, even where display data needs to be written in the storage device at a high speed in order to display moving pictures without causing a feeling of physical disorder, the writing frequency can be lowered. This would be more effective where the amount of display data that is required to display one frame increases as a result of an increase in the screen size of a display section or an increase in the number of gradation bits. Therefore, a lower cost process can be used to manufacture storage devices by a corresponding amount, and an increase in the power consumption can be suppressed.

Also, a display unit in accordance with the present invention includes: a panel with electrooptical elements that are driven by a plurality of first electrodes and a plurality of second electrodes; any one of the display controllers described above that drives the plurality of first electrodes; and a scan driving driver that scan-drives the plurality of second electrodes.

The present invention can provide a display unit that can display moving pictures without causing a feeling of physical disorder even where the amount of display data is increased due to an increase in the screen size of a liquid crystal panel or an increase in the number of gradation bits.

Also, a display unit in accordance with the present invention includes: a panel with electrooptical elements that are driven by a plurality of first electrodes and a plurality of second electrodes; a display controller described above that drives the plurality of first electrodes; a scan driving driver that scan-drives the plurality of second electrodes; and a display data supply circuit that supplies the display data to the display controller.

In the present invention, since the display data supply circuit that supplies the display data is mounted on the display unit, the user can omit designing an interface between the display data supply circuit and the display controller. This allows the number of manufacturing steps and the number of parts to be reduced, which contributes to lowering the cost of development.

Also, in accordance with the present invention, the display data supply circuit includes: a current supply source; a differential driver that, where a current supplied from the current supply source changes based on display data, supplies a differential signal corresponding to the change to the display controller; and a differential driver control device that performs a differential control of the current source, where, during a period after display data is supplied to the display controller until the next display data is supplied thereto, the receiving operation stopping device stops or limits a current of a current source of the differential amplifier, and the differential driver control device stops or limits a current of the current source.

The present invention realizes a fast speed transfer of display data through the signal lines of the differential pair, and can reduce the current consumption on the receiver side when data transfer is not required. By doing so, the present invention can provide a display unit that can suppress an increase in the power consumption that may result from transferring a larger amount of display data, which may be caused by an increase in the screen size of a display section, and can reconcile a higher transfer rate and a lower power consumption.

Also, an electronic apparatus in accordance with the present invention includes any of the display units described above.

The present invention can provide an electronic apparatus that can display a variety of pictures including moving pictures at a low power consumption even where the amount of display data for one frame increases due to an increase in the screen size or an increase in the number of gradation bits.

DETAILED DESCRIPTION OF PREFERRED EMBODIMENTS

Preferred embodiments of the present invention will be described below with reference to the accompanying drawings.

<First Embodiment>

1. Electronic Apparatus

Figure 1:
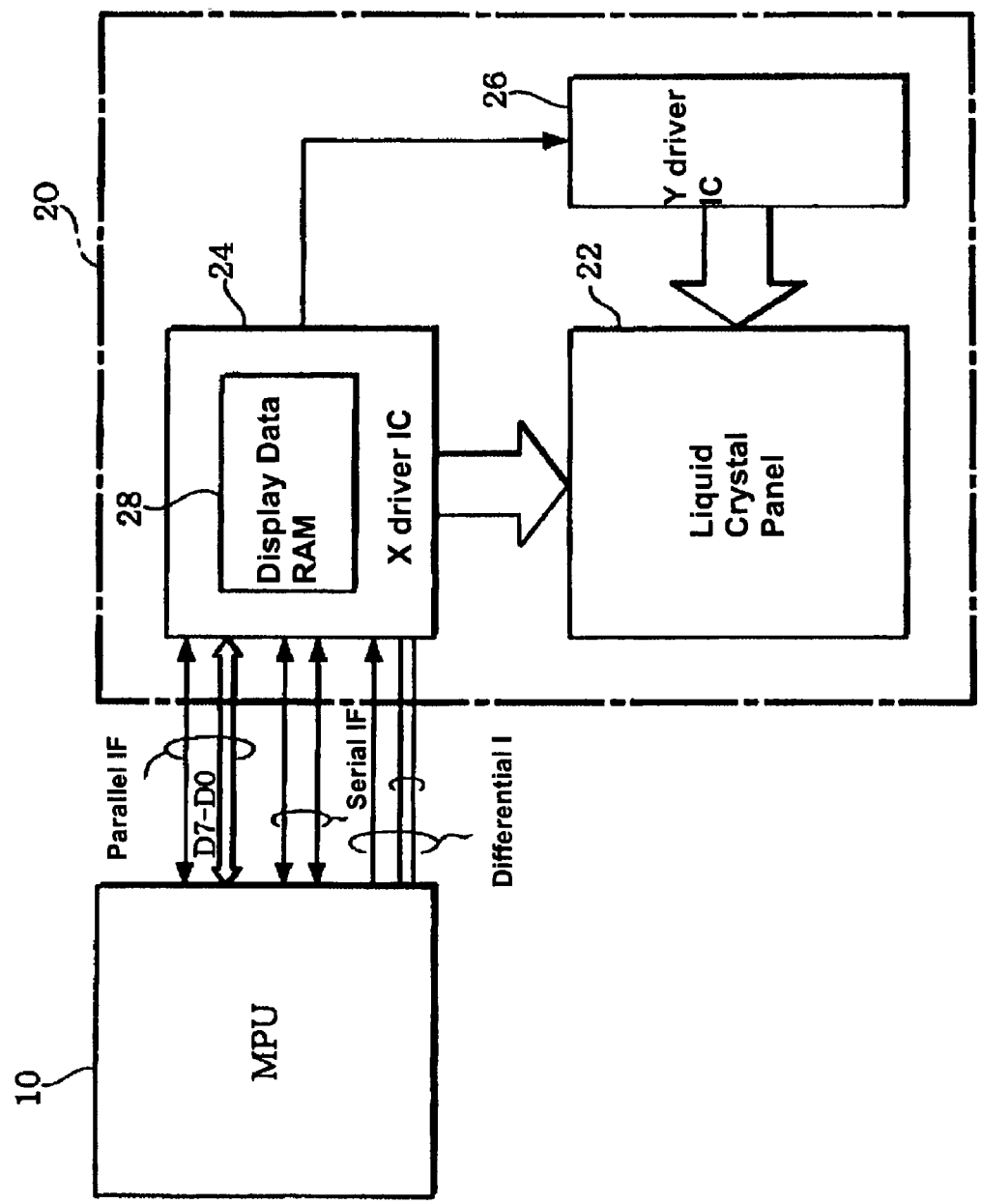
FIG. 1 is a schematic that shows one example of a summary structure of an electronic apparatus in which a display controller in accordance with a first embodiment of the present invention.

FIG. 1 shows one example of a summary structure of an electronic apparatus in which a display controller in accordance with a first embodiment of the present invention.

The electronic apparatus includes an MPU (Micro Processor Unit) (a display data supply circuit in a broader sense) 10, and a display unit 20. The MPU 10 supplies to the display unit 20 one of moving picture data and still picture data or both moving and still picture data. The display unit 20 display-drives a display section based on display data supplied from the MPU 10. Here, the display data is, for example, moving picture data, still picture data, and data that are required to display-drive the display section with display control signals for the picture data.

The display unit 20 includes a matrix panel with electrooptic elements, such as a color liquid crystal panel (a display section in a broader sense) 22, an X driver IC with a built in RAM (a display controller in a broader sense) 24 that drives the liquid crystal panel 22, and a Y driver IC 26 to scan.

The matrix panel 22 may be any device that uses liquid crystal or any other electrooptic element that changes its optical characteristic by an application of voltage. The liquid crystal panel 22 can be structured by, for example, a simple matrix panel. In this case, liquid crystal is sealed between a first substrate on which a plurality of segment electrodes (first electrodes) are formed and a second substrate on which common electrodes (second electrodes) are formed. The liquid crystal panel 22 may be an active matrix panel that uses three-terminal elements or two-terminal elements such as thin film transistors (TFTs) or thin film diodes (TFDs). Such an active matrix panel includes a plurality of signal electrodes (first electrodes) driven by the X driver IC 24 and a plurality of scanning electrodes (second electrodes) driven by the Y driver IC 26.

In the electronic apparatus shown in FIG. 1, the MPU 10 and the display unit 20 are connected through at least a parallel interface (hereafter referred to as "IF") signal line and a differential IF signal line. In FIG. 1, in addition to the above, they are also connected through a serial IF signal line.

The parallel interface signal line includes an 8-bit data bus with D7–D0, where display commands and still picture data are transferred and received through this 8-bit data bus. In FIG. 1, command/data identification signals are transferred and received through, for example, a parallel IF control signal line that is provided independently of the 8-bit data bus to identify data transferred through the 8-bit data bus with D7–D0 as display commands or still picture data. Display commands are commands to perform display controls, such as, for example, setting of a display region on a liquid crystal panel (setting of a display region of still pictures, setting of a display region of moving pictures). Still picture data are display data to display still pictures in a display region set by a display command. This parallel IF control signal is used for transfer and reception of other signals, such as a reverse reset signal XRES, a reverse chip select signal XCS, a reverse read signal XRD and a reverse write signal XWR. The X driver IC 24 performs a wiring control of still picture data with these control signals for the display data RAM 28.

The differential IF signal line includes signal lines of a differential pair, in which moving picture data defining R, G, B signals, each including 6 bits, synchronizing clock and the like that are converted to differential signals through the signal lines of the differential pair are transferred and received. In this instance, a power control signal PS is transferred and received through a differential IF control signal line that is provided independently of the signal lines of the differential pair. The X driver IC 24 and the MPU 10 perform differential IF operation controls with the power control signal PS. Also, the X driver IC 24 takes in the differential signal in synchronism with the synchronizing clock, and writes the same in the display data RAM 28.

A serial IF signal line transfers one bit by one bit moving picture data defining R, G, B signals, each including 6 bits. Also, it similarly supplies a clock signal CLK, a vertical synchronizing signal Vsync, and a horizontal synchronizing signal Hsysnc (or a composite signal of horizontal and vertical synchronizing signals H·Vsysnc). The X driver IC 24 writes moving picture data in the display data RAM 28 in synchronism with the clock signal CLK and the synchronizing signals.

The X driver IC 24 reads display data stored in the display data RAM 28 at a given frame frequency (for example, 60 frames per second (hereafter referred to as "f/s"), 30 f/s, 15 f/s or the like) in a given display unit (for example, in a unit of one scanning line or in a unit of multiple scanning lines), and display-drives the liquid crystal panel 22 based on the read display data.

In FIG. 1, the MPU 10 and the display unit 20 are connected through the respective interfaces. However, the display unit 20 can be structured such that it includes the MPU 10. In this case, the MPU 10 directly transfers and receives display data to and from the X driver IC 24 through the above-described interfaces.

Figure 2:
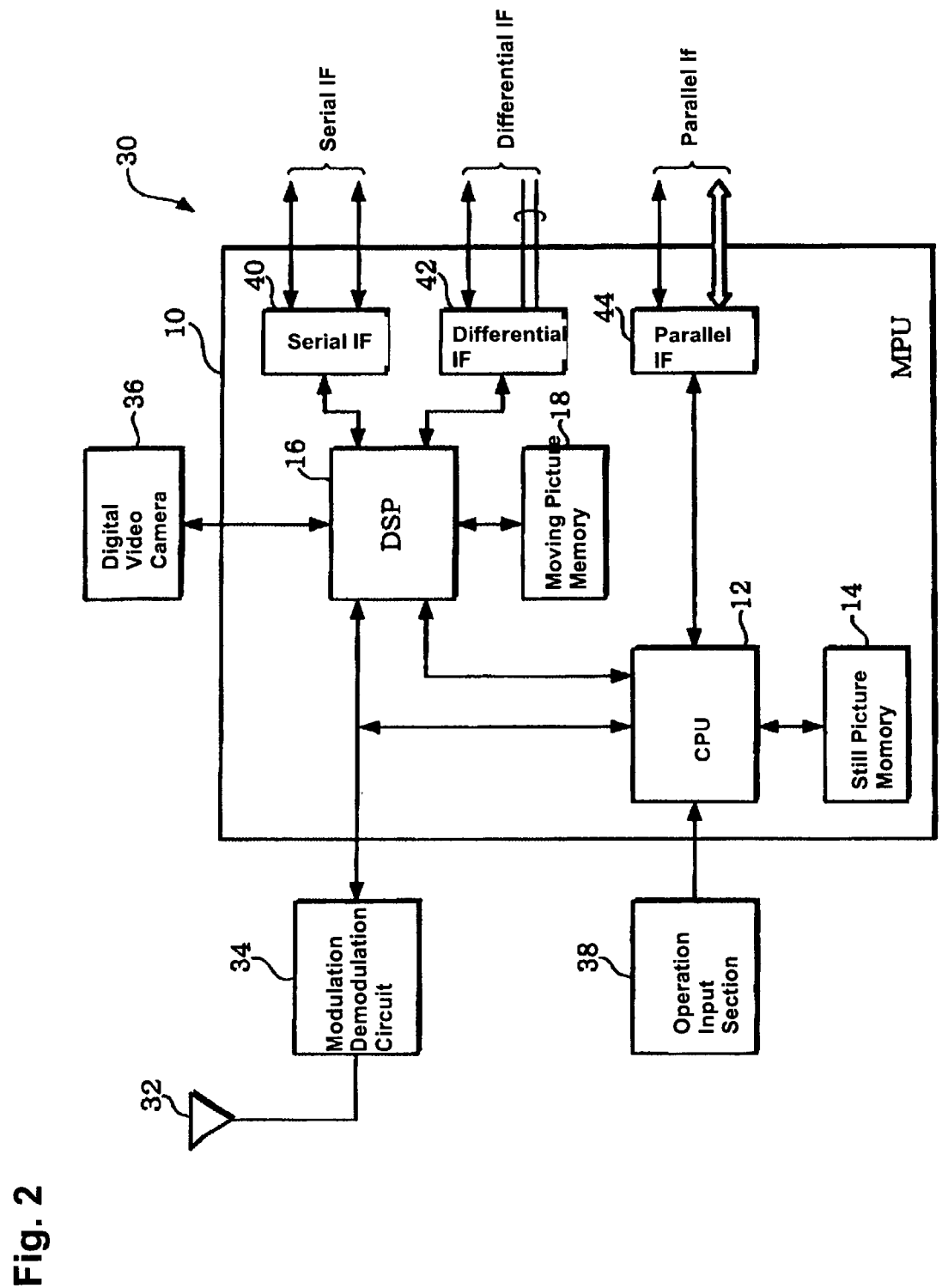
FIG. 2 is a schematic that shows an example structure of a mobile telephone in which an MPU and a display unit are built in accordance with the first embodiment.

FIG. 2 is a schematic that shows an example in which the MPU 10 and the display unit 20 depicted in FIG. 1 are mounted on a mobile telephone 30.

The MPU 10 shown in FIG. 2 includes a central processing unit (hereafter referred to as "CPU") 12 that governs the control of the mobile telephone 30, and the CPU 12 connects to a still picture memory 14 and a DSP (digital signal processor) 16. Also, the DSP 16 connects to a moving picture processing memory 18. Furthermore, the MPU 10 includes a serial IF circuit 40, a differential IF circuit 42 and a parallel IF circuit 44 that realize IF functions to the X driver IC 24 shown in FIG. 1.

The mobile telephone 30 is provided with a modulation/demodulation circuit 34 that demodulates signals received through an antenna 32 and modulates signals to be transmitted through the antenna 32. The antenna 32 is capable of transmitting and receiving moving picture data that are coded by Layer IV standard of MPEG ("Moving Picture Experts Group"), for example.

The mobile telephone 30 is provided with a digital video camera 36, for example, to take in moving picture data. Operational information, required for data transmission and reception at the mobile telephone 30 and photographing by the digital video camera 36, are inputted through an operation input section 38.

The CPU 12 decides a display region of the liquid crystal panel 22 based on, for example, moving picture data. Moving pictures displayed in the decided display region are supplied, for example, from the antenna 32 or the digital video camera 36. Signals inputted from the antenna 32 are demodulated through the modulation/demodulation circuit 34 and signal-processed by the DSP 16. The DSP 16 connects to a moving picture processing memory 18, decompresses compressed data inputted through antenna 32 and the modulation/demodulation circuit 34, and decodes data coded by the MPEG Layer IV standard. Data to be transmitted through the modulation/demodulation circuit 34 and the antenna 32 is compressed by the DSP 16, and encoded by the MPEG Layer IV standard when transmitted. In this manner, the DSP 16 can have functions of a decoder and an encoder of the MPEG Layer IV standard, for example.

Signals from the digital video camera 36 are also inputted in the DSP 16, and signals inputted from the antenna 32 or the digital video camera 36 are processed to RGB signals by the DSP 16 and supplied to the display unit 20.

Moving picture data generated by the DSP 16 is supplied to the display unit 20 by the serial IF signal line through the serial IF circuit 40 or by the differential IF signal line through the differential IF circuit 42. Which one of the IF signals lines is used to transfer and receive moving picture data may be decided by the CPU 12 depending on the size of the display region of the moving picture.

Meanwhile, the CPU 12, based on information from the operation input section 38 and by using a still picture memory 14 depending on the requirements, outputs commands required to display still pictures to be displayed on the liquid crystal panel 22 and still picture data to the display unit 20 via the parallel IF signal line through the parallel IF circuit 44.

For example, moving pictures may be movie information distributed through the Internet, and information for reserving tickets at cinema theaters may be displayed as still pictures, and ticket reservations may be made based on information from the operation input section 38. In this case, the CPU 12 also performs transfer controls of, for example, reservation information through the modulation/demodulation circuit 34 and the antenna 32. Also, depending on the requirements, the CPU 12 can perform transfer controls of moving picture information photographed by the digital video camera 36.

2. X driver IC (Display Controller)

2.1 Structure

Figure 3:
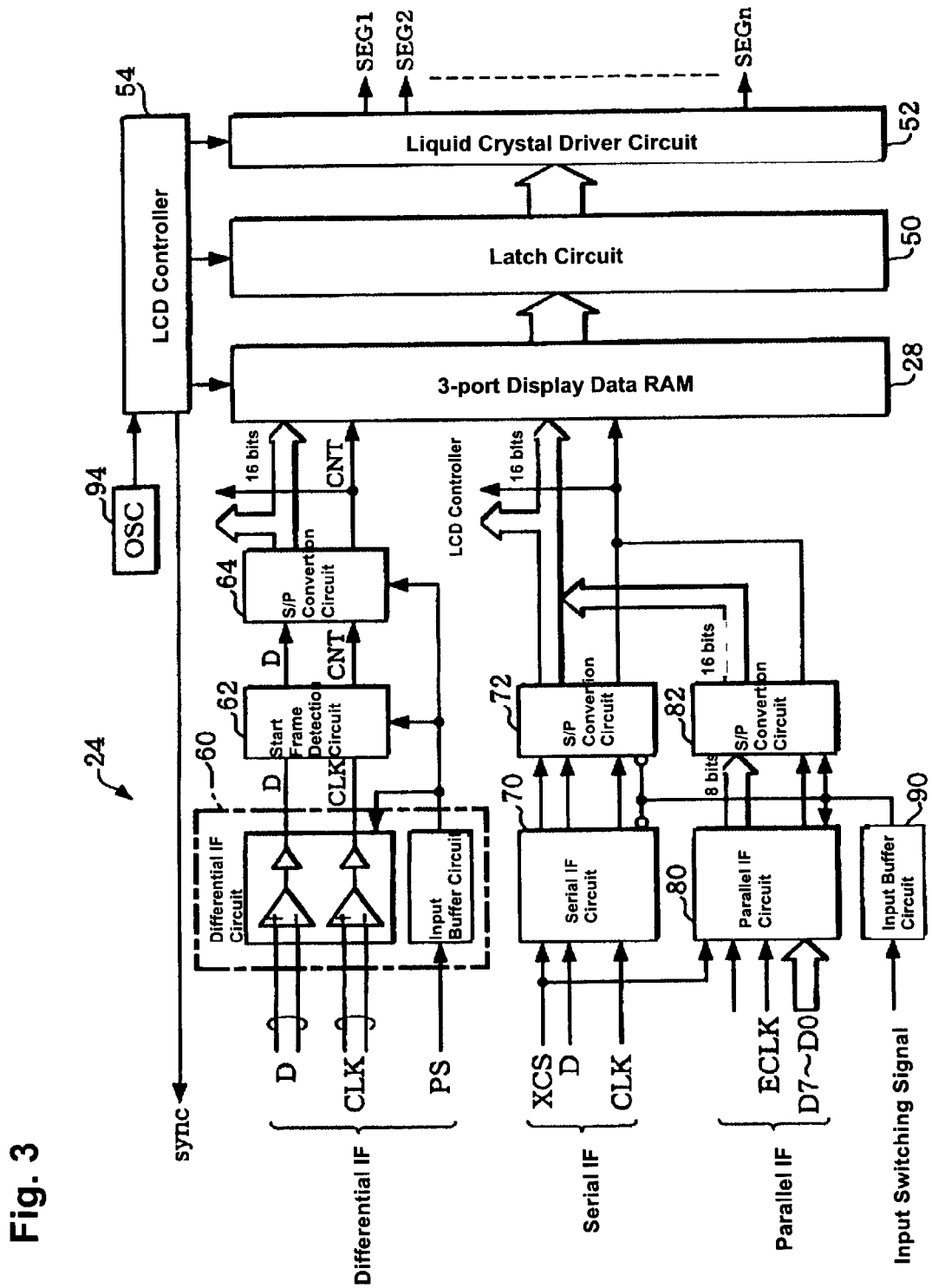
FIG. 3 is a schematic that shows one example of a key structural portion of an X driver IC as a display controller in accordance with the first embodiment.

FIG. 3 is a schematic that shows one example of a key structure of the X driver IC as a display controller in the first embodiment shown in FIG. 1.

The X driver IC 24 includes a latch circuit 50, a liquid crystal driver circuit 52 and an LCD controller 54, in addition to the display data RAM 28 described above.

The LCD controller (a display data writing device in a broader sense) 54 governs the overall control of the X driver IC 24, and performs controls to write and read display data in and from the display data RAM 28 and a driving control to display on the liquid crystal panel.

The LCD controller 54 performs a control to read display data from the display data RAM 28 in a specified display unit at a constant frame cycle. Display data read out from the display data RAM 28 is latched by the latch circuit 50 in synchronism with a latch signal generated by the LCD controller. The data latched at the latch circuit 50 are converted by display drive control signals provided by the LCD controller 54 into signals with pulse widths corresponding to gradation values according to the polarity inversing cycle, shifted to voltages according to the voltages of the LCD display system, and supplied to segment electrodes SEG1–SEGn of the liquid crystal panel 22.

Display data that are display-controlled by the LCD controller 54 and commands that control the LCD controller 54 are received through at least the parallel IF and the differential IF. In addition, as depicted in FIG. 3, they can also be received through the serial IF.

The display data RAM 28 of the X driver IC 24 in the first embodiment has three ports. Specifically, the display data RAM 28 has a first port to write moving picture data transferred through the serial IF signal line or still picture data (display data) transferred through the parallel IF signal line, a second port to write moving picture data (display data) transferred through the differential IF signal line, and a third port to read out display data for display-driving the display section.

The differential IF signal line and the differential IF control signal line are connected to a differential IF circuit (a first display data receiving device) 60. The differential IF circuit 60 includes a differential amplifier that amplifies a data signal D (with a bit width K=1) defining a differential signal received through the signal lines of the differential pair and a clock signal CLK. The structure of the differential amplifier is known and therefore its detailed description is omitted. However, it amplifies the differential signal based on changes in the current supplied from the current source.

Also, the differential IF circuit 60 includes an input buffer circuit that buffers the power control signal PS that is transferred and received through the differential IF control signal line. The input buffer circuit is formed from a CMOS circuit.

The data signal D defining a differential signal and the clock signal CLK that have been amplified by the differential amplifier of the differential IF circuit 60 are supplied to a start frame detection circuit 62.

The start frame detection circuit 62 monitors bit trains of the data signal D received in synchronism with the clock signal CLK, and judges whether a start frame is present based on a pre-set bit pattern. A bit train of the data signal D that is determined as a start frame by the start frame detection circuit 62 is supplied to a serial-parallel (hereafter referred to as "S/P") conversion circuit (a first bit width conversion device) 64.

The S/P conversion circuit 64 converts a bit train with one bit width, which is provided from the start frame detection circuit 62, into a parallel data with 16 bits (a bit width L=16), for example. The parallel data is supplied together with control signals, such as a timing detection signal of the start frame detected by the start frame detection circuit 62 to the LCD controller 54 and the display data RAM 28. The parallel data are written in the display data RAM 28 through the first port in a unit of 16 bits (a bit width L=16).

Also, the power control signal PS, that is buffered by the input buffer circuit of the differential IF circuit 60, is supplied at least to the differential amplifier of the differential IF circuit 60. In FIG. 3, the power control signal PS is also supplied to the start frame detection circuit 62 and the S/P conversion circuit 64.

The differential amplifier of the differential IF circuit 60 amplifies the differential signal based on changes in the current supplied from the current source, and stops or limits the current supplied from the current source with the power control signal PS to thereby perform an operation control thereof. Also, the start frame detection circuit 62 and the S/P conversion circuit 64 also stop their operations by the power control signal PS at the same timing as that of the operation control of the differential amplifier.

The serial IF signal line is connected to the serial IF circuit 70. The serial IF circuit 70 buffers the data signal D inputted in serial, clock signal CLK and inverted chip select signal XCS. The serial IF circuit 70 is formed from a CMOS circuit. Where the inverted chip select signal XCS is active, the data signal D that is inputted in serial in synchronism with the buffered clock signal CLK is supplied to the S/P conversion circuit 72.

The S/P conversion circuit 72 converts the data signal D inputted in serial into parallel data with 16 bits (a bit width L=16), for example. The parallel data is supplied with control signals, such as the clock signal CLK to the LCD controller 54 and the display data RAM 28. The parallel data are written in the display data RAM 28 through the second port in a unit of 16 bits (a bit width L=16).

The parallel IF signal line and parallel IF control signal line are connected to a parallel IF circuit (a second display data receiving device in a broader sense) 80. The parallel IF circuit 80 buffers parallel data signals D7–D0 with 8 bits (a bit with N=8), for example, a clock signal ECLK and other control signals (including an inverted chip select signal XCS and the like). The parallel IF circuit 70 is formed from a CMOS circuit. Where the inverted chip select signal XCS is active, the data signals D7–D0 that are received in parallel in synchronism with the buffered clock signal ECLK are supplied to a S/P conversion circuit (a second bit width conversion circuit in a broader sense) 82.

The S/P conversion circuit 82 converts the data signals D7–D0 inputted in parallel into parallel data with 16 bits (a bit width L=16), for example. The parallel data is supplied with control signals such as the clock signal ECLK to the LCD controller 54 and the display data RAM 28. The parallel data are written in the display data RAM 28 through the second port in a unit of 16 bits (a bit width L=16).

Also, the X driver IC 24 has an input buffer circuit 90 that buffers an input switching signal to operate only one of the serial IF and the parallel IF. The serial IF circuit 70 and the S/P conversion circuit 72 and the parallel IF circuit 80 and the S/P conversion circuit 82 are controlled by the input switching signal to be exclusively operated with respect to one another.

Further, the X driver IC 24 has an oscillation circuit (OSC) 94, and the LCD controller 54 outputs a display timing sync (vertical synchronizing signal Vsysnc/horizontal synchronizing signal Hsysnc) based on the oscillation output of the OSC 94.

2.2 Blanking Period

The X driver IC 24, as a display controller in the first embodiment, is equipped with the display data RAM, and reads out display data from the display data RAM at a constant frame cycle to display-drive the display section. For this reason, writing of display data corresponding to given scanning lines in a given frame needs to be conducted in advance of reading for the scanning lines. Also, since the amount of display data would increase with an increase in the screen size or an increase in the gradation bit number, the reception of display data for a given frame is started at an earlier time in order to secure the time for transferring such an increasing amount of display data.

By doing so, the write timing for the given scanning lines in the given frame always occurs earlier than the read timing therefore. This promotes simplification of the timing generation.

For this reason, in accordance with the first embodiment, a dummy blanking period is provided before the start of each scanning, and display data is transferred during the blanking period. As a result, the write timing and the read timing described above do not need to be considered.

Figure 4:
FIG. 4(A) is a schematic that describes a relationship between a vertical synchronizing signal and a horizontal synchronizing signal.
FIG. 4(B) is a schematic that describes dummy blanking periods.
Figure 4:
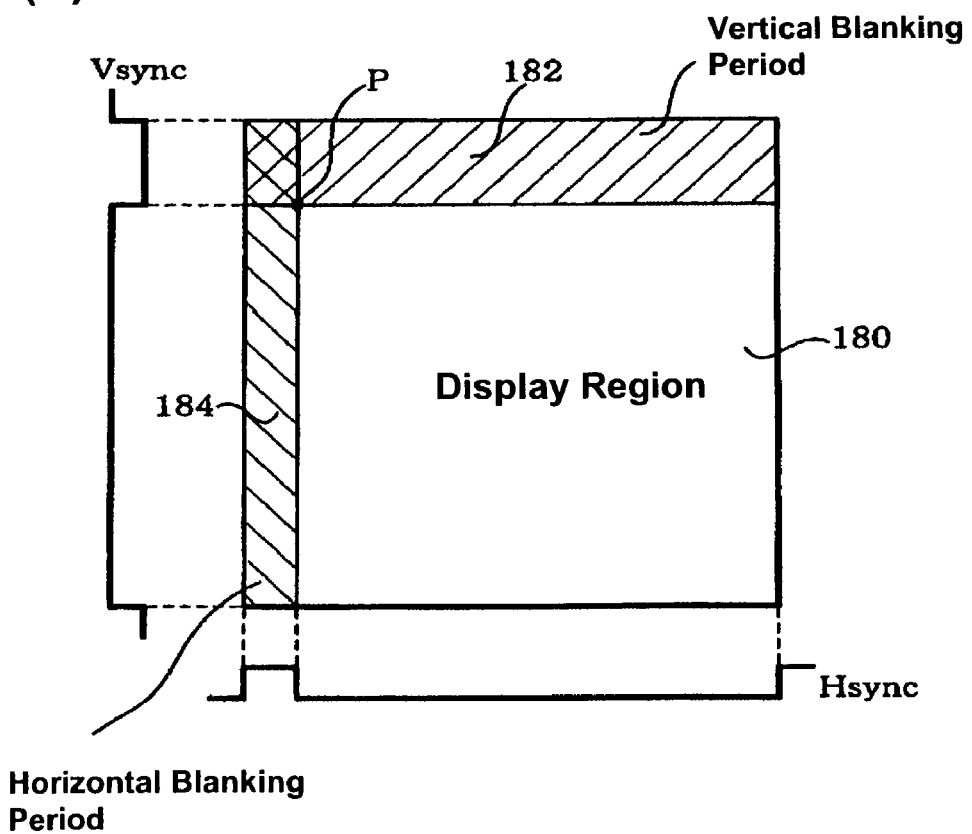
Figure 5:
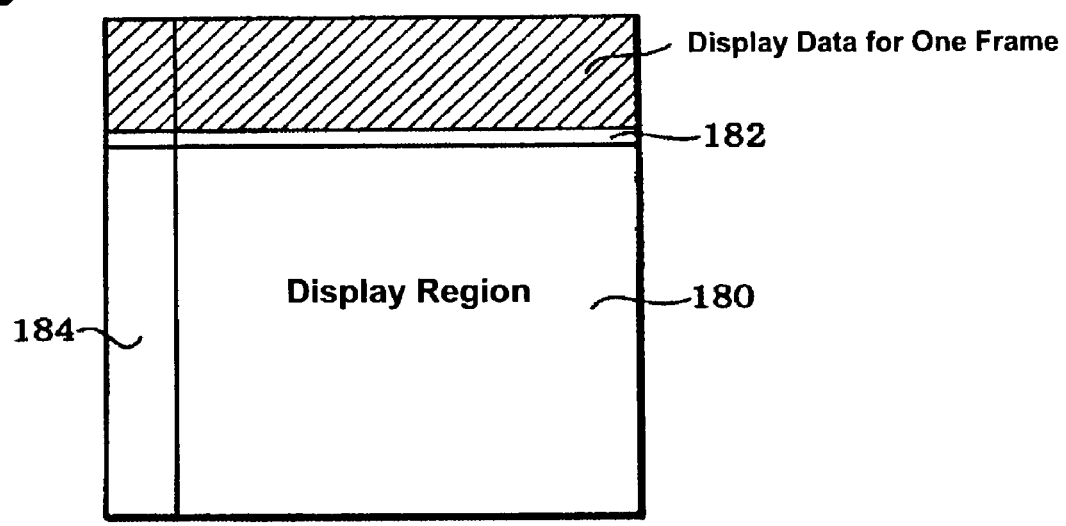
FIG. 5 is a schematic that describes the control to transfer display data for one frame during a dummy vertical blanking period in accordance with the first embodiment.

FIGS. 4(A) and 4(B) are schematics that describe the dummy blanking period.

The liquid crystal panel is display-driven through synchronizing the vertical synchronizing signal Vsync indicative of a scanning start timing for one frame with the horizontal synchronizing signal Horizontal synchronizing signal Hsync indicative of a scanning start timing for each scanning line in each frame. Specifically, as shown in FIG. 4(A), in synchronism with a fall of the vertical synchronizing signal Vsync, scanning lines in each frame are display-driven from a first scanning line, and successively driven in synchronism with the horizontal synchronizing signal Hsysnc.

Therefore, as the vertical synchronizing signal Vsync is drawn along a vertical axis and the horizontal synchronizing signal Hsync is drawn along a horizontal axis, a picture for one frame is displayed in a display region 180 shown in FIG. 4(B). In other words, with a point P shown in FIG. 4(B) as a reference, the vertical scanning and the horizontal scanning on the display section are started.

Here, where a period in which the vertical synchronizing signal Vsync is at "H" level is defined as a dummy vertical blanking period, a region 182 defines a non-display region. Also, where a period in which the horizontal synchronizing signal Hsync is at "H" level is defined as a dummy horizontal blanking period, a region 184 defines a non-display region Accordingly, in synchronism with a rise of the vertical synchronizing signal Vsync, display data is received at a high transfer rate during the dummy vertical blanking period, such that display data for one frame is written in the display data RAM. As a result, in the frame, data writing occurs always in advance of data reading as far as each scanning line is concerned, and therefore the display-driving for one frame can be conducted without considering the timings therefore.

Here, where the dummy vertical blanking period is made longer than a period represented by at least D/R, where D defines the display data for one frame and R defines the transfer rate, and the read timing for reading from the display data RAM is started, writing of display data for the frame would be completed therein. Because of this, writing and reading of the display data RAM having three ports would not be simultaneously conducted. As a result, current variations in the display data RAM, which occur with writing or reading operations, would be reduced, which enhances the anti-noise characteristic.

2.3 High-speed Transfer Control by Differential IF

The X driver IC 24 as a display controller of the first embodiment as described above transfers and receives moving picture data with the differential IF using the operation amplifier. Unlike the IF achieved by a CMOS circuit, the differential IF can realize a high-speed data transfer rate with the differential pair implemented therein to thereby perform transfer and reception of signals with a small amplitude. As a result, this would realize a transfer rate that cannot be achieved by a CMOS circuit but is required to display moving pictures without causing a feeling of physical disorder, even where the screen size of liquid crystal panels is enlarged in the future, which would enable moving picture data to be written in the display data RAM.

To realize such a differential IF, a differential driver that drives signals of the differential pair and a differential amplifier that amplifies the signals of the differential pair are required. A current source to be used for the differential driver and the differential amplifier for the differential IF circulates a steady current without depending on transfer rates. Therefore, where the transfer rate is low, the IF by the CMOS circuit has smaller power consumption. On the other hand, where the transfer rate is high, the IF by the CMOS circuit has greater power consumption, and the differential IF that use the power by a steady current can have smaller power consumption. Moreover, the differential IF can achieve a transfer rate that cannot be attained by the IF provided by the CMOS circuit.

In the first embodiment, while a high speed transfer of display data is conducted by the differential IF, the liquid crystal panel needs to be display-driven in synchronism with the vertical synchronizing signal and the horizontal synchronizing signal. Accordingly, where display data is transferred, the data transfer is controlled in a manner that the transfer is conducted at a high-speed transfer rate, and then the differential IF is stopped until the next transfer timing, to suppress an increase in the power consumption.

A structure of such a differential IF will be described below.

2.3.1 Structure Examples of Differential IF (First Structure Example)

Figure 6:
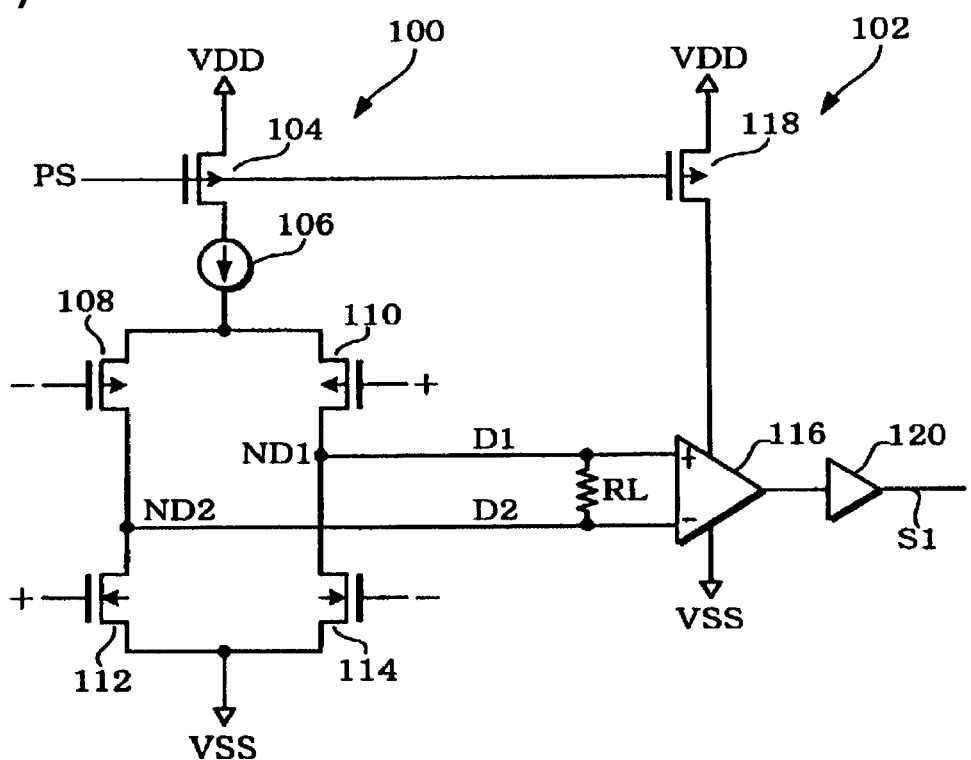
FIG. 6(A) is a schematic that shows a structure of a differential IF in a first structure example.
FIG. 6(B) is a schematic that shows one example of an operation waveform of the first structure example.
Figure 6:
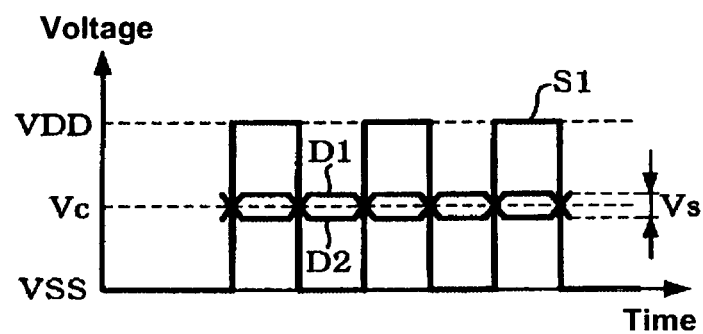

FIG. 6(A) is a schematic that shows a first example of a structure of a differential IF, and FIG. 6(B) is a schematic that shows one example of an operation waveform of the first structure example.

The first structure example is provided with a differential driver 100 on the transfer side and a differential receiver 102 on the reception side, which are connected to one another through signal lines D1 and D2 of a differential pair. The differential driver 100 is structured to be included in the differential IF circuit 42 of the MPU in FIG. 2. Also, the differential receiver 102 is structured to be included in the differential IF circuit 60 in FIG. 3.

The differential driver 100 on the transfer side includes a p-type (a first conductive type) transistor 104 (a differential driver control device in a broader sense) with its source terminal being connected to a power supply VDD (a first power source), and its gate terminal receiving a power control signal PS. A drain terminal of the p-type transistor 104 is connected to one end of a current source 106.

The other end of the current source 106 connects to source terminals of p-type transistors 108 and 110.

Drain terminals of the p-type transistors 108 and 110 are connected to drain terminals of n-type (a second conductive type) transistors 112 and 114. An inverse signal (XD+ signal) of a D+ signal indicating a + side of a data signal D to be transferred is supplied to a gate terminal of the p-type transistor 108. The D+ signal is supplied to a gate terminal of the p-type transistor 110.

Source terminals of the n-type transistors 112 and 114 are connected to a ground power supply VSS (a second power supply). A D− signal indicating a − side of the data signal D is supplied to a gate terminal of the n-type transistors 112. An inverse signal (XD− signal) of the D− signal is supplied to a gate terminal of the n-type transistors 114.

In the differential driver 100, a junction point ND1 between the drain terminal of the p-type transistor 110 and the drain terminal of the n-type transistors 114, and a junction point ND2 between the drain terminal of the p-type transistor 108 and the drain terminal of the n-type transistors 112 are connected to the signal lines D1 and D2 of the differential pair, respectively.

The differential receiver 102 has a differential amplifier 116. The structure of the differential amplifier 116 is known and its description is omitted. However, where the current from the current source changes in response to a change in the potentials received on the signal lines of the differential pair, it generates a voltage according to the change.

The differential amplifier 116 is connected to the power supply VDD through a p-type transistor 118 (a receiving operation stopping device in a broader sense). The power control signal PS is supplied to a gate terminal of the p-type transistor 118. Where a drain current of the p-type transistor 118 is supplied to the differential amplifier 116 by the power control signal PS, the differential amplifier 116 operates. However, where the drain current is stopped or limited, its operation is stopped.

The signal lines D1 and D2 of the differential pair are connected through an end terminal resistance RL, and the differential amplifier 116 of the differential receiver 102 amplifies a voltage generated between the ends of the end terminal resistance RL. The amplified signal is buffered by a buffer circuit 120, and supplied as a reception signal S1 to a circuit in a succeeding stage.

By the structure described above, in the differential driver 100, the current from the current source 106 changes by the D+ signal and the D− signal, and the current flowing at the junction points ND1 and ND2 changes, and a voltage is generated between the ends of the end terminal resistance RL through the signal lines D1 and D2 of the differential pair. The differential receiver 102 amplifies with the differential amplifier 116 the voltage generated between the ends of the end terminal resistance RL.

Accordingly, as depicted in FIG. 6(B), since a differential signal with an amplitude of Vs (for example, 300 mV) with Vc (for example, 1.2V) being at the center can be transferred, data transfer at a higher speed becomes possible. The differential amplifier 116 on the reception side amplifies the same, and buffers and converts the same into logical levels, which can be used by a CMOS circuit in a succeeding stage.

In this instance, the differential IF depicted in FIG. 6(A) can lower the power consumption by performing operation controls on the transfer side and the reception side with the power control signal PS during a period after only display data required to display is transferred at a high speed until the next transfer timing.

Figure 7:
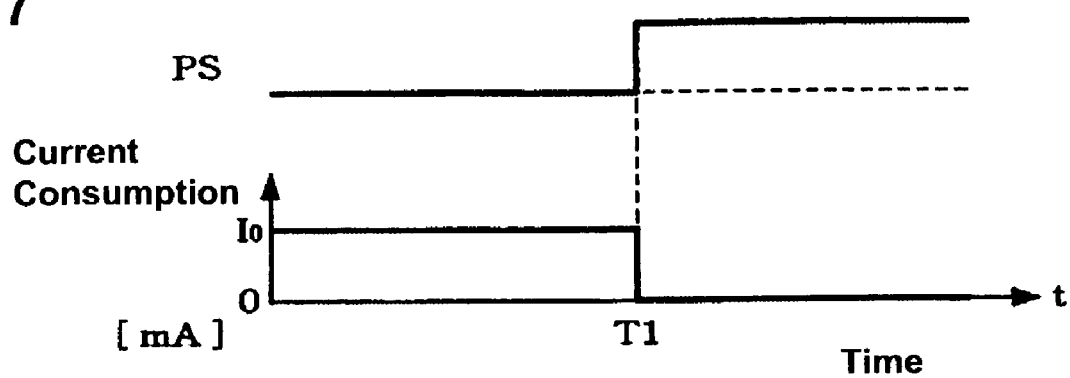
FIG. 7 is a schematic that describes the power saving control by the power control signal.

FIG. 7 schematically shows changes in the current consumption attained by the power control signal PS.

More specifically, where the logical level of the power saving control signal PS is at "L", the differential driver on the transfer side and the differential driver on the reception side operate, such that a steady current $I_0$ by the current source flows. On the other hand, when the logical level of the power saving control signal PS is at "H", the differential driver on the transfer side and the differential driver on the reception side stop their operations, such that the power consumption by the steady current becomes zero.

Accordingly, the logical level of the power saving control signal PS is set at "L" to transfer data at a high speed, and then the logical level of the power saving control signal PS is set at "H" to stop the transfer side and the reception side to thereby suppress an increase in the power consumption.

(Second Structure Example)

Figure 8:
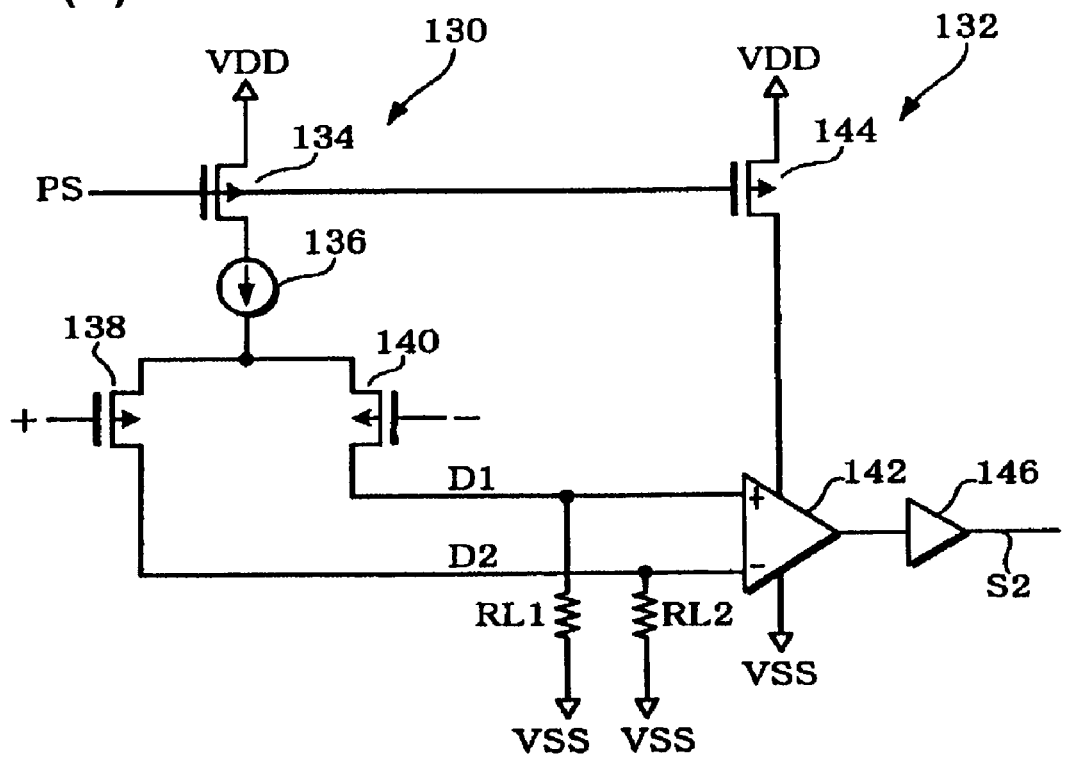
FIG. 8(A) is a schematic that shows a structure of a differential IF in a second structure example.
FIG. 8(B) is a schematic that shows one example of an operation waveform of the second structure example.
Figure 8:
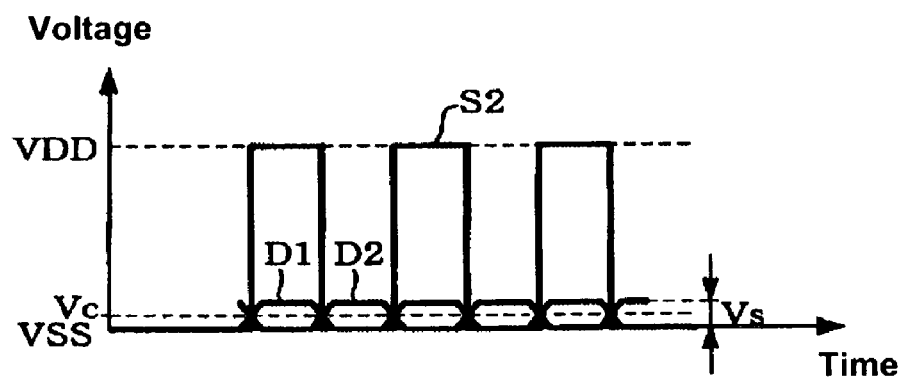

FIG. 8(A) is a schematic that shows a second example of a structure of a differential IF, and FIG. 8(B) is a schematic that shows one example of an operation waveform of the second structure example.

The second structure example is provided with a differential driver 130 on the transfer side and a differential receiver 132 on the reception side, which are connected to one another through signal lines D1 and D2 of a differential pair. The differential driver 130 is structured to be included in the differential IF circuit 42 of the MPU in FIG. 2. Also, the differential receiver 132 is structured to be included in the differential IF circuit 60 in FIG. 3.

The differential driver 130 on the transfer side includes a p-type transistor 134 (a differential driver control device in a broader sense) with its source terminal being connected to a power supply VDD, and its gate terminal receiving a power control signal PS. A drain terminal of the p-type transistor 134 is connected to one end of a current source 136.

The other end of the current source 136 connects to source terminals of p-type transistors 138 and 140.

Drain terminals of the p-type transistors 138 and 140 are connected to the signal lines D2 and D1 of the differential pair. A data signal D to be transferred is supplied to a gate terminal of the p-type transistor 138. An inverted signal of the data signal D to be transferred is supplied to a gate terminal of the p-type transistor 140.

The differential receiver 132 has a differential amplifier 142. The structure of the differential amplifier 142 is known and its description is omitted. However, where the current from the current source changes in response to a change in the potentials received on the signal lines of the differential pair, it generates a voltage according to the change.

The differential amplifier 142 is connected to the power supply VDD through a p-type transistor 144 (a receiving operation stopping device in a broader sense). The power control signal PS is supplied to a gate terminal of the p-type transistor 144. Where a drain current of the p-type transistor 144 is supplied to the differential amplifier 142 by the power control signal PS, the differential amplifier 142 operates. However, where the drain current is stopped or limited, its operation is stopped.

The signal lines D1 and D2 of the differential pair are connected through end terminal resistances RL1 and RL2 to the ground potential VSS, respectively. The differential amplifier 142 of the differential receiver 132 amplifies a potential difference between the signal lines D1 and D2 of the differential pair, which is generated by the end terminal resistances RL1 and RL2. The amplified signal is buffered by a buffer circuit 146 and supplied as a reception signal S2 to a circuit in a succeeding stage.

By the structure described above, in the differential driver 130, the current from the current source 136 changes by the data signal D, and the drain currents of the p-type transistors 138 and 140 change. As a result, the potential between the signal lines D1 and D2 of the differential pair is changed by the end terminal resistances RL1 and RL2; and at the differential receiver 132, the differential amplifier 142 amplifies the potential difference.

Accordingly, as depicted in FIG. 8(B), since a differential signal with an amplitude of Vs (for example, 300 mV) with Vc (for example, 150 mV) being at the center can be transferred, data transfer at a higher speed becomes possible. The differential amplifier 142 on the reception side amplifies the same, and buffers and converts the same into logical levels, which can be used by a CMOS circuit in a succeeding stage.

In this instance, the differential IF depicted in FIG. 8(A) can lower the power consumption by performing operation controls on the transfer side and the reception side with the power control signal PS, as indicated in FIG. 7.

(Third Structure Example)

Figure 9:
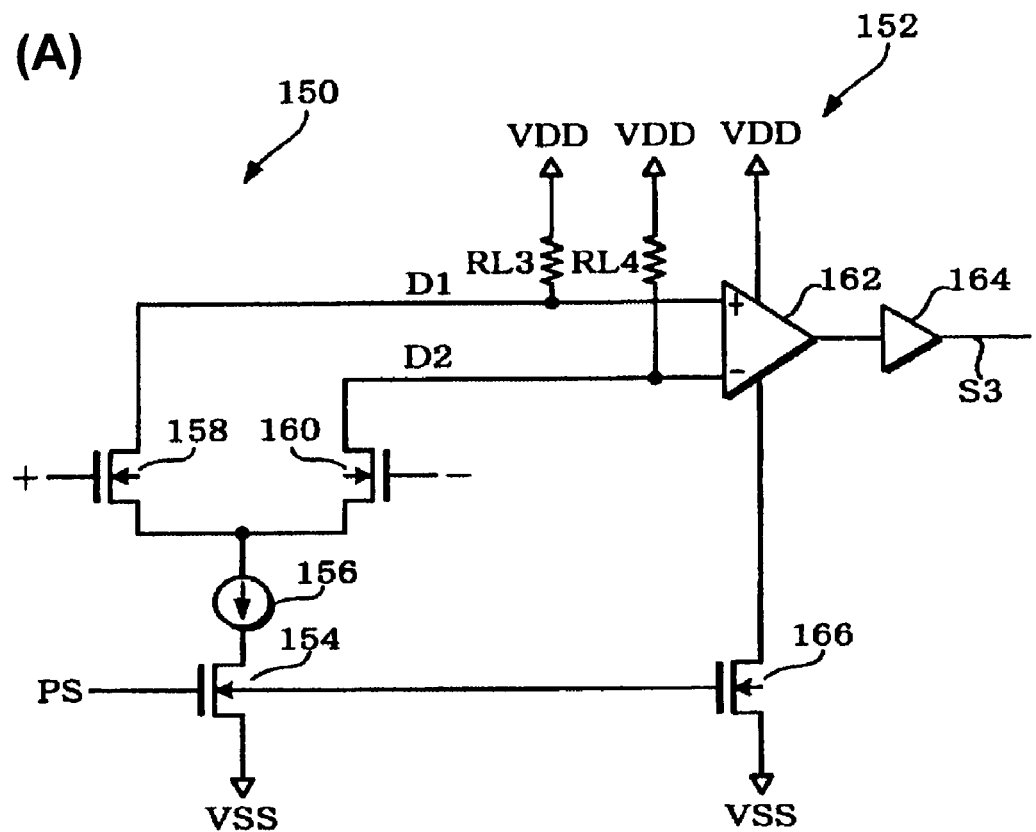
FIG. 9(A) is a schematic that shows a structure of a differential IF in a third structure example.
FIG. 9(B) is a schematic that shows one example of an operation waveform of the third structure example.
Figure 9:
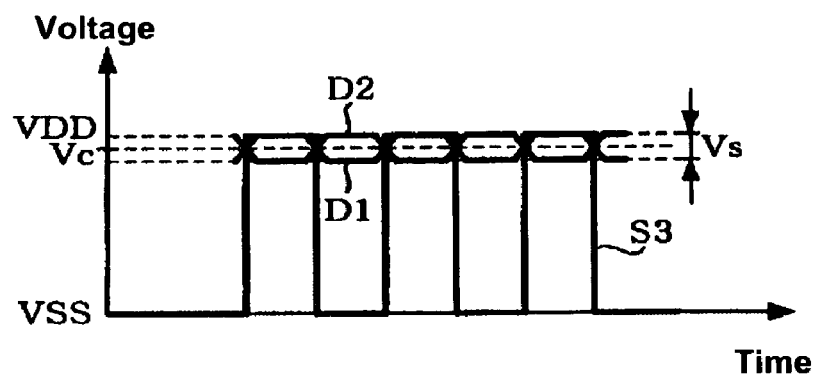

FIG. 9(A) is a schematic that shows a third example of a structure of a differential IF, and FIG. 9(B) is a schematic that shows one example of an operation waveform of the second structure example.

The third structure example is provided with a differential driver 150 on the transfer side and a differential receiver 152 on the reception side, which are connected to one another through signal lines D1 and D2 of a differential pair. The differential driver 150 is structured to be included in the differential IF circuit 42 of the MPU in FIG. 2. Also, the differential receiver 152 is structured to be included in the differential IF circuit 60 in FIG. 3.

The differential driver 150 on the transfer side includes an n-type transistor 154 (a differential driver control device in a broader sense) with its source terminal being connected to a ground power supply VSS, and its gate terminal receiving a power control signal PS. A drain terminal of the n-type transistor 154 is connected to one end of a current source 156.

The other end of the current source 156 connects to source terminals of n-type transistors 158 and 160.

Drain terminals of the n-type transistors 158 and 160 are connected to the signal lines D2 and D1 of the differential pair. A data signal D to be transferred is supplied to a gate terminal of the n-type transistor 158. An inverted signal of the data signal D to be transferred is supplied to a gate terminal of the n-type transistor 160.

The differential receiver 152 has a differential amplifier 162. The structure of the differential amplifier 162 is known and its description is omitted. However, where the current from the current source changes in response to a change in the potentials received on the signal lines of the differential pair, it generates a voltage according to the change.

The differential amplifier 162 is connected to the ground power supply VSS through an n-type transistor 166 (a receiving operation stopping device in a broader sense). The power control signal PS is supplied to a gate terminal of the n-type transistor 166. Where a drain current of the n-type transistor 166 is supplied to the differential amplifier 162 by the power control signal PS, the differential amplifier 162 operates. However, where the drain current is stopped or limited, its operation is stopped.

The signal lines D1 and D2 of the differential pair are connected through end terminal resistances RL3 and RL4 to the potential VDD, respectively. The differential amplifier 162 of the differential receiver 152 amplifies a potential difference caused by the end terminal resistances RL3 and RL4. The amplified signal is buffered by a buffer circuit 164 and supplied as a reception signal S3 to a circuit in a succeeding stage.

By the structure described above, in the differential driver 150, the drain currents of the n-type transistors 158 and 160 in which the current is supplied from the current source 156 change by the data signal D. As a result, the potential between the signal lines D1 and D2 of the differential pair is changed by the end terminal resistances RL3 and RL4; and at the differential receiver 152, the differential amplifier 162 amplifies the potential difference.

Accordingly, as depicted in FIG. 9(B), since a differential signal with an amplitude of Vs (for example, 300 mV) with Vc (for example, VDD−150 mV) being at the center can be transferred, data transfer at a higher speed becomes possible. The differential amplifier 162 on the reception side amplifies the same, and buffers and converts the same into logical levels, which can be used by a CMOS circuit in a succeeding stage.

In this instance, the differential IF depicted in FIG. 9(B) can lower the power consumption by performing operation controls on the transfer side and the reception side with the power control signal PS, as indicated in FIG. 7.

2.4 Comparison with IF by CMOS Circuit

The above-described differential IF that is capable of a high-speed data transfer will be compared with an IF by a CMOS circuit, and their power consumption at the time of transfer controls using the dummy blanking periods will be explained.

Figure 10:
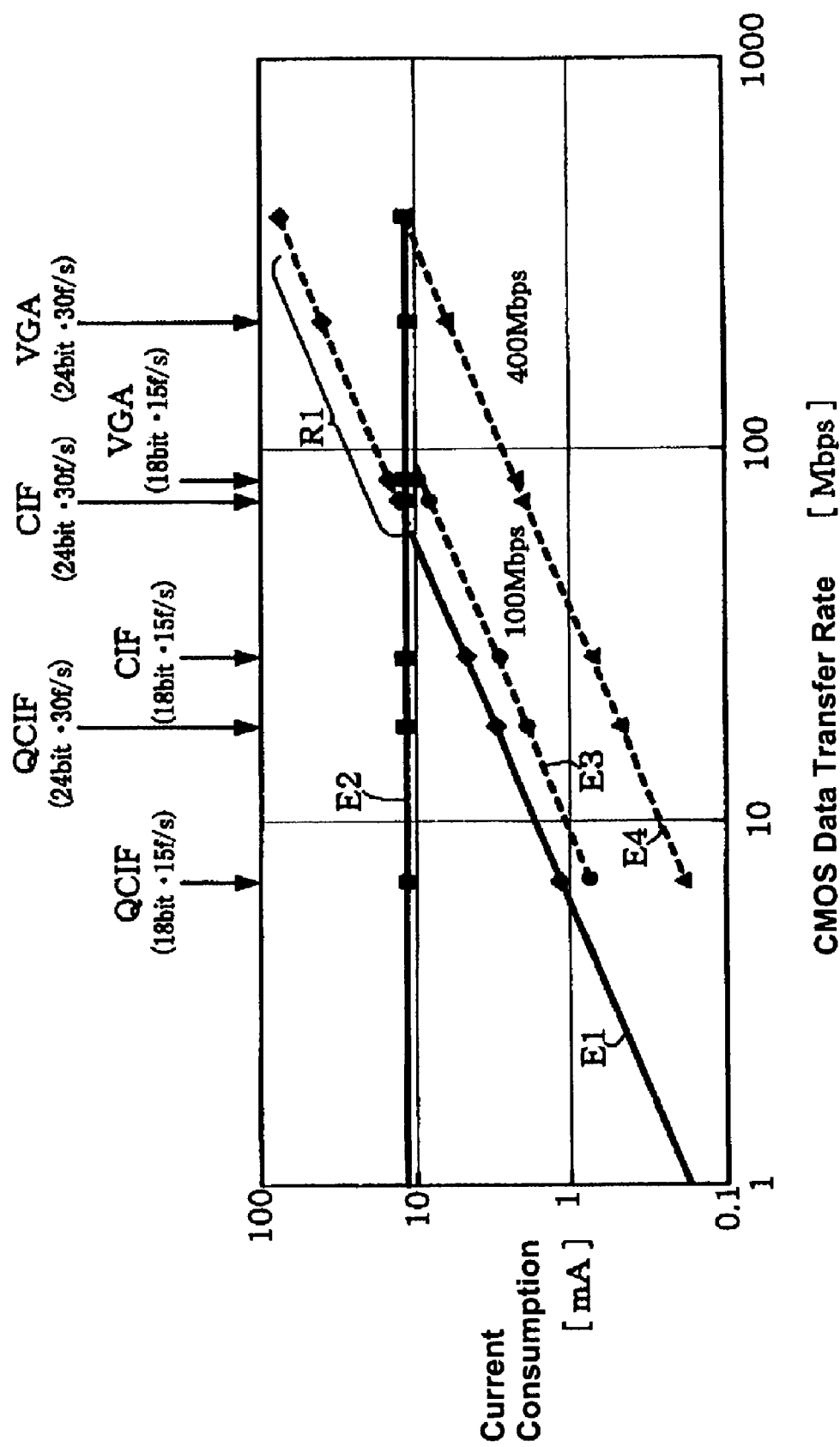
FIG. 10 is a graph that describes a relationship of transfer rates and power consumption of an IF with CMOS circuit.

FIG. 10 is a schematic that shows relationships of transfer rates and power consumption of an IF with CMOS circuit.

In FIG. 10, data transfer rates [Mbps] ("Mega bits per second") are presented along a horizontal axis, and power consumption [mA] (milliampere) is presented along a vertical axis.

Also, because the transfer amount of display data required to display one frame differs depending on the screen size of each liquid crystal panel and the number of gradation bits, FIG. 10 shows typical screen sizes and gradation bit numbers. For example, FIG. 10 shows cases of transferring RGB signals in QCIF ("Quarter Common Intermediate Format," 176×144) size, each in 6 bits (18 bits in total), at 15 f/s; RGB signals in CIF (352×288) size, each in 8 bits (24 bits in total), at 30 f/s; and RGB signals in VGA ("Video Graphics Array," 640×480) size, each in 8 bits (24 bits in total), at 30 f/s.

In the IF with CMOS circuit, the power consumption increases in proportion to the frequency, and therefore the current consumption increases (E1) as the transfer rate becomes greater. Therefore, in the case of transferring display data of RGB signals in QCIF size, each in 6 bits (18 bits in total), at 15 f/s, it can be performed with a sufficiently small current consumption. However, in the case of transferring display data of RGB signals in CIF size, each in 8 bits (24 bits in total), at 30 f/s, the required transfer rate becomes high, and the current consumption also increases. Furthermore, it would become difficult for the CMOS circuit to realize transfer rates in a region indicated by R1, and it is difficult to transfer display data of RGB signals in CIF size, each in 8 bits (24 bits in total), at 30 f/s.

On the other hand, in the differential IF, a steady current flows independent of transfer rates as indicated by E2. Therefore, in the case of transferring display data of RGB signals in QCIF size, each in 6 bits (18 bits in total), at 15 f/s, its current consumption is large compared to the IF with CMOS circuit. However, in the differential IF, a constant steady current is consumed without regard to transfer rates. Therefore, in the case of transferring display data of RGB signals in CIF size, each in 8 bits (24 bits in total), at 30 f/s, its current consumption becomes small compared to the IF with CMOS circuit. Furthermore, the differential IF can transfer display data at a transfer rate that cannot be realized by the CMOS circuit.

Accordingly, the transfer of display data is started during the dummy blanking period described above at a high-speed transfer rate, such as, at 100 Mbps, 400 Mbps, etc., which cannot be realized by the CMOS circuit, and the operation of the differential IF is stopped after the completion of data transfer until the next transfer timing of display data to thereby reduce the consumption of the steady current. By doing so, a high-speed transfer rate and a lower current consumption can both be attained (E3, E4).

2.5 Write Bit Width

The X driver IC 24 as a display controller in the first embodiment described above can write display data in the display data RAM 28 in a unit of a bit width L (L is a natural number) that is greater than at least K and N, where K (K is a natural number) is a bit width of the differential IF or the serial IF, and N (N is a natural number greater than K) is a bit width of the parallel IF.

By this, even where display data needs to be written in the display data RAM at a high speed in order to display moving pictures without causing a feeling of physical disorder, the write frequency can be reduced. This would accommodate cases in which display data required to display one frame increases as a result of an increase in the screen size of liquid crystal panels. For example, where the write frequency in writing in a unit of 8 bits in the display data RAM 28 is F, the write frequency in writing in a unit of 16 bits can be F/2. Therefore, a low cost process can be used accordingly to manufacture the display data RAM, and an increase in the current consumption can be suppressed.

2.6 Operation Timing of Display Controller

Next, an operation of the X driver IC 24 in the first embodiment will be described in detail. Descriptions are provided below assuming that the first structure example shown in FIGS. 6(A) and (B) is applied as a differential IF, but the same applies to the second and the third structure examples.

Figure 11:
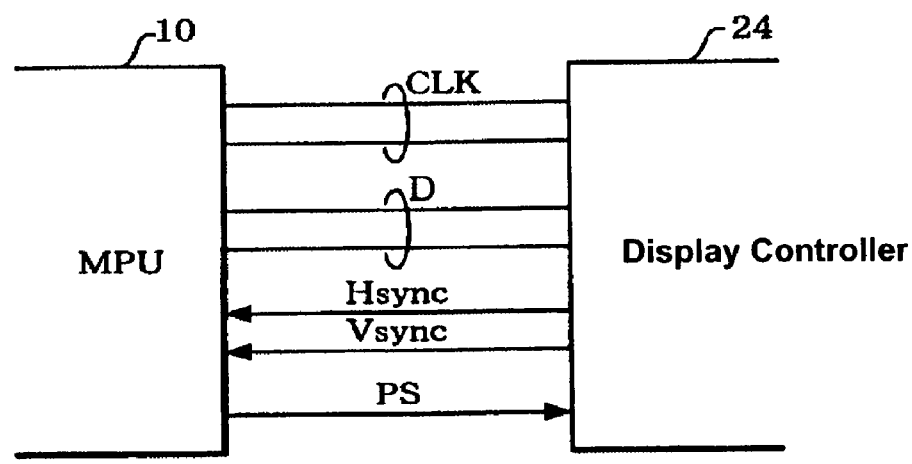
FIG. 11(A) is a schematic that describes one example of signals that are transferred and received by the differential IF.
FIG. 11(B) is a schematic that describes another example of signals that are transferred and received by the differential IF.
Figure 11:
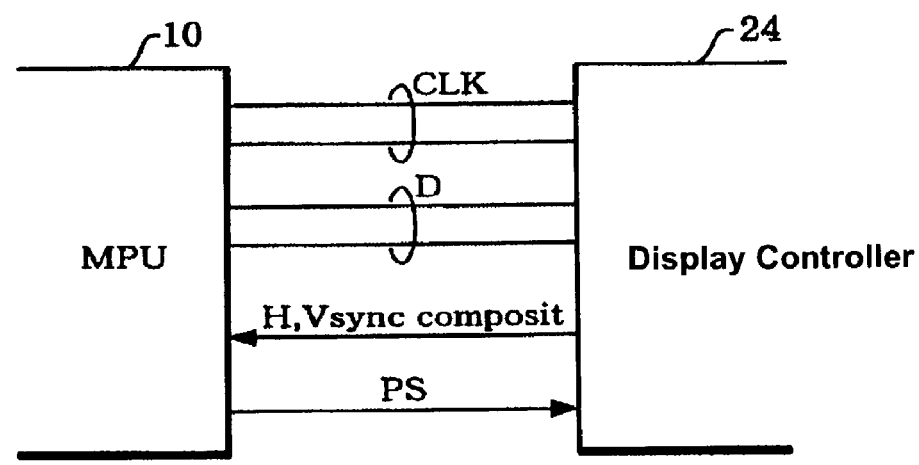

FIGS. 11(A) and (B) are schematics that show specific examples of signals that are transferred and received by the differential IF.

Referring to FIG. 11(A), a clock signal CLK and a data signal D are transferred from the MPU 10 to the display controller 24 through the signal lines of the differential pair. Also, the display controller 24 transfers a vertical synchronizing signal Vsync and a horizontal synchronizing signal Hsync through the IF with a CMOS circuit in order to notify display timings internally generated to the MPU 10.

Since the MPU 10 recognizes the amount of display data to be transferred by the signal line D of the differential pair, it generates a power control signal PS to stop the operation of the differential IF after the display data is transferred with the notified vertical synchronizing signal Vsync and the horizontal synchronizing signal Hsync as being references, and performs operation controls of the transfer side of the MPU 10 and the reception side of the display controller 24.

Also, as shown in FIG. 11(B), the display controller 24 may notify to the MPU 10 with a composite signal that combines a vertical synchronizing signal Vsync and a horizontal synchronizing signal Hsync.

Figure 12:
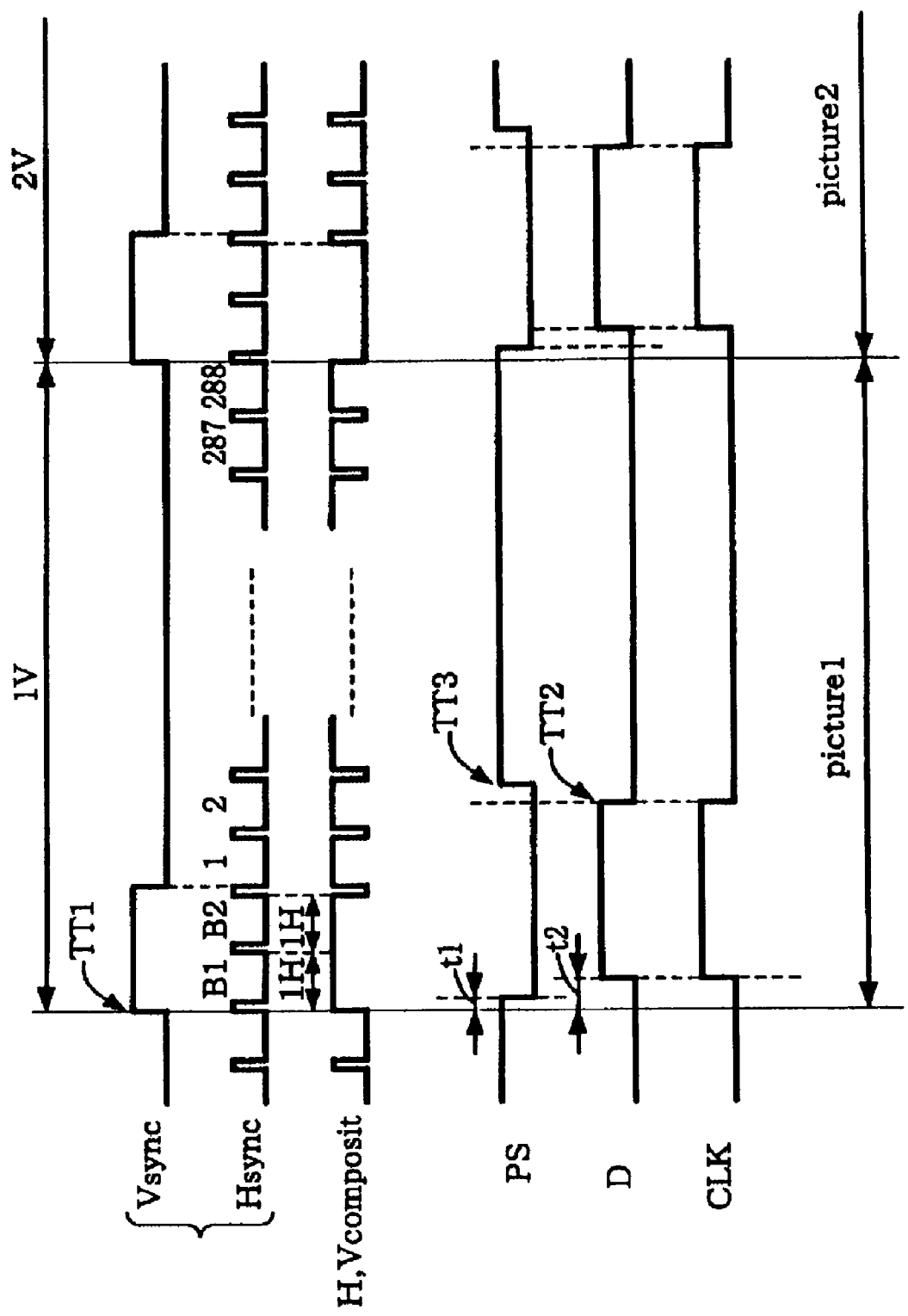
FIG. 12 is a timing chart of one example of operation timings where display data is transferred to the display controller of the first embodiment at 60 f/s.

FIG. 12 is a timing chart that shows one example of operation timings in the case of transferring display data to the display controller through the differential IF described above at 60 f/s.

Here, one vertical scanning period is formed of, for example, 288 horizontal scanning periods, and vertical blanking periods B1 and B2. In other words, a dummy vertical blanking period is provided for a period corresponding to two horizontal scanning periods.

In order to notify the internally generated display timings to the MPU 10 that is on the display data supply side, the display controller 24 outputs a vertical synchronizing signal Vsync and a horizontal synchronizing signal Hsync or a composite signal of vertical·horizontal synchronizing signals.

Upon detection of a rise of the vertical synchronizing signal Vsync and a rise of the horizontal synchronizing signal, or a rise of the composite signal of vertical·horizontal synchronizing signals (at time TT1), the MPU 10 notifies to the display controller 24 a time t1 later than the time TT1 (t1≦1H, where 1H is one horizontal scanning period) to start the operation of the differential IF with the power control signal PS. From this moment on, and during a period in which the logical level of the power control signal PS is at "L", the differential IF circuit 42 of the MPU 10 and the differential IF circuit 60 of the display controller 24 are operated, and a steady current flows.

Where a time t2(t1≦t2≦1H) elapses since the time TT1, the MPU 10 starts transferring the data signal D and clock signal CLK with the differential IF, and transfers display data for one frame at a high-speed transfer rate, for example, at 100 Mbps–400 Mbps, until time TT2.

In other words, during the dummy vertical blanking period, transfer of display data for one frame is started. The MPU 10 recognizes the transfer data amount for display data for one frame, and therefore knows a transfer time Tp to transfer display data for one frame based on the relation with respect to a pre-set transfer rate. Thus, the MPU 10 sets the logical level of the power control signal PS at "L" for the transfer time Tp for transferring the display data for at least one frame.

As a result, where the transfer of the display data for one frame is completed, the logical level of the power control signal PS becomes "H" at time TT3(TT2≦TT3), such that the operation of the differential IF is stopped. From this moment on, and during a period in which the logical level of the power control signal PS is at "H", the differential IF circuit 42 of the MPU 10 and the differential IF circuit 60 of the display controller 24 stop their operation, and the current consumption becomes zero.

Meanwhile, in synchronism with a fall of the vertical synchronizing signal Vsync in the vertical scanning period 1V, the display controller 24 reads from the display data RAM the display data for the frame that was written during the vertical blanking period, after the horizontal scanning period 1H, successively from the first scanning line, to thereby drive the liquid crystal panel (to display picture1) as described above.

In the case of the frame cycle being 60 Hz, where the vertical synchronizing signal Vsync rises in the next vertical scanning period 2V, the transfer control of display data for the second frame is performed in the same manner as that for the vertical scanning period 1V, and the display data for that frame that was written during the vertical blanking period in the vertical scanning period 2V is read out, and the liquid crystal panel is driven (to display picture2) as described above.

In this manner, in the differential IF, while display data for one frame is being transferred, a steady current flows, and the operation of the differential IF is stopped at completion of the transfer. As a result, the current consumption occurring with the transfer of display data for each frame is only a steady current of the differential IF from time t1 to TT3. Accordingly, this can lower the current consumption, compared to the case of the IF with CMOS circuit, as indicated in FIG. 10. This would become more effective where the amount of display data to be transferred increases.

Figure 13:
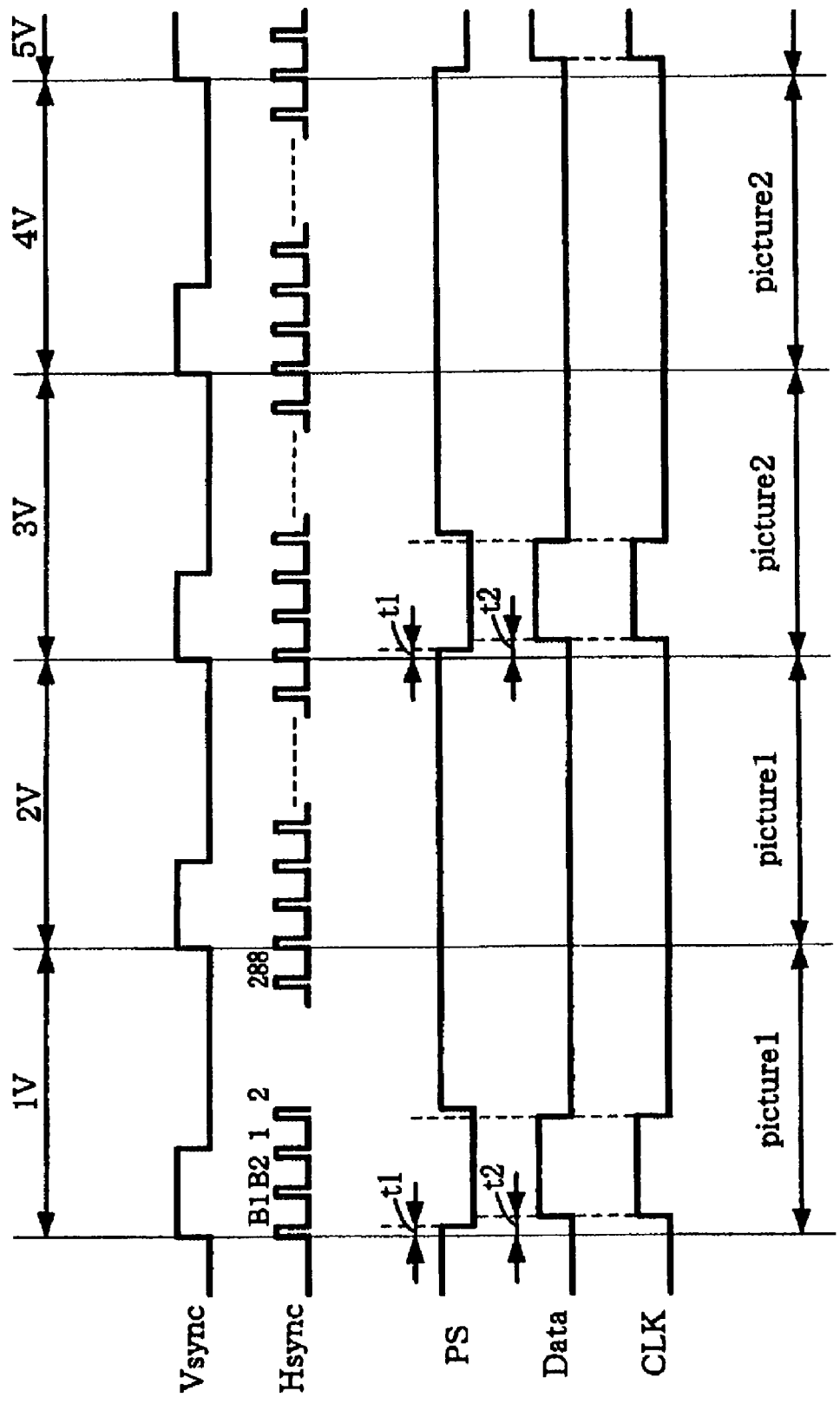
FIG. 13 is a timing chart of one example of operation timings where display data is transferred to the display controller of the first embodiment at 30 f/s.

FIG. 13 a timing chart that shows one example of operation timings where display data is transferred to the display controller through the differential IF described above at 30 f/s.

In this case also, the transfer control of the display data is conducted in a similar manner as that employed for 60 f/s indicated in FIG. 12.

Where the display controller 24 display-drives the liquid crystal panel at a frame cycle of 60 Hz, the display driving is conducted based on the same display data for consecutive two frames. Therefore, display data is transferred in the first frame as indicated in FIG. 12, and the next display data may be transferred in the third frame, skipping one frame. In other words, the stopping period of the differential IF becomes longer, and therefore the current consumption can be further lowered.

Figure 14:
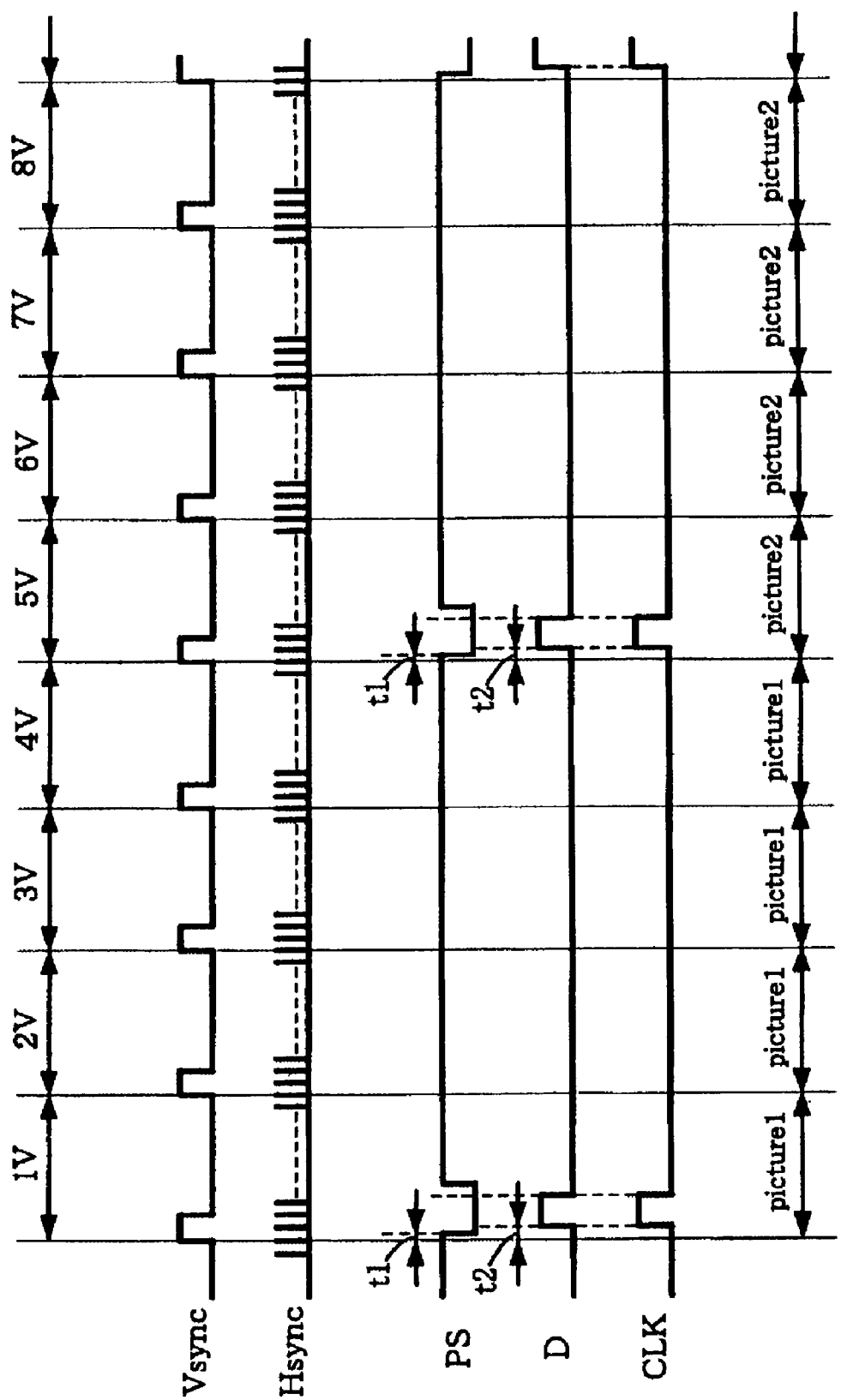
FIG. 14 is a timing chart of one example of operation timings where display data is transferred to the display controller of the first embodiment at 15 f/s.

FIG. 14 is a timing chart that shows one example of operation timings when display data is transferred to the display controller through the differential IF described above at 15 f/s.

In this case also, the transfer control of the display data is conducted in a similar manner as that employed for 60 f/s indicated in FIG. 12.

However, where the display controller 24 display-drives the liquid crystal panel at a frame cycle of 60 Hz, the display driving is conducted based on the same display data for consecutive four frames. Therefore, display data is transferred in the first frame as indicated in FIG. 12, and the next display data may be transferred in the fourth frame, skipping three frames. In other words, the stopping period of the differential IF becomes longer, and therefore the current consumption can be further lowered.

Practically, where moving pictures are driven and displayed on a liquid crystal panel, the moving pictures, up to 15 f/s, can be recognized without causing a feeling of physical disorder by virtue of the human visual characteristics. In this case, a display of moving pictures that complies with an increased screen size and a sufficient reduction in the current consumption can both be attained.

<Second Embodiment>

3. Characteristics of Second Embodiment

The first embodiment is described assuming that display data for one frame is transferred in one lot, using a dummy vertical blanking period, during this period. However, the present invention is not limited to this embodiment. In accordance with a second embodiment, display data for specified scanning lines may be transferred, using a dummy horizontal blanking period during that period. This would also accommodate increases in the screen size of liquid crystal panels with a high-speed transfer control of the differential IF, which is compatible with the reduction in the current consumption.

A display controller, and a display unit and an electronic apparatus using the same in the second embodiment, may have the same structure as that of the first embodiment, and therefore their description is omitted.

3.1 Dummy Horizontal Blanking Period

Figure 15:
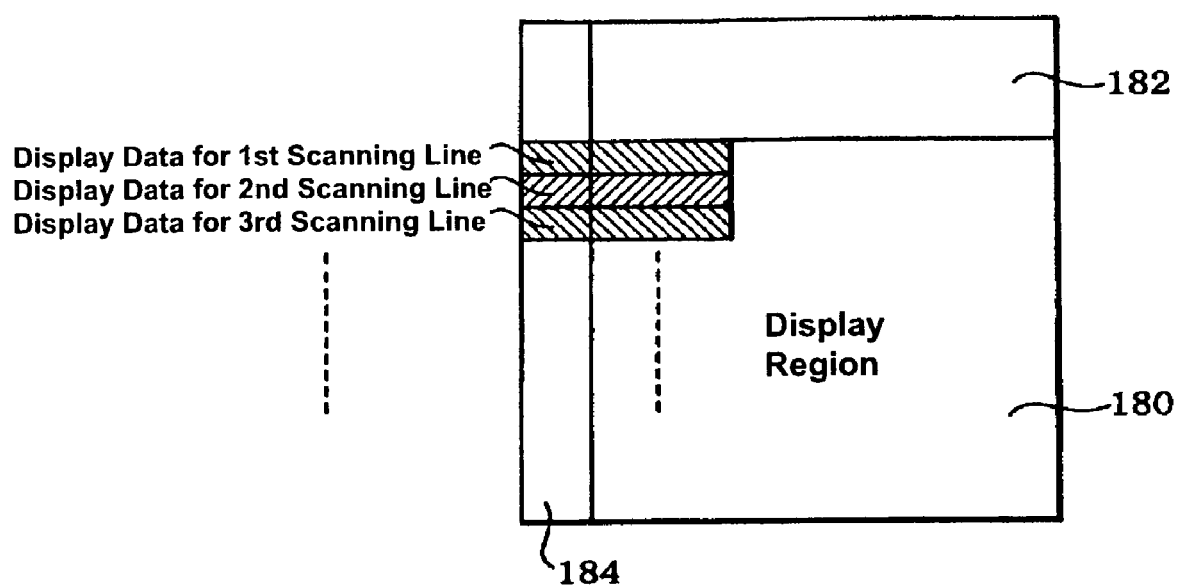
FIG. 15 is a schematic that describes the control to transfer display data in a unit of a scanning line during a dummy horizontal blanking period in accordance with a second embodiment of the present invention.

FIG. 15 is a schematic that describes the dummy horizontal blanking period.

In the second embodiment, in synchronism with a rise of the horizontal synchronizing signal Hsync, display data is transferred at a high speed during a dummy horizontal blanking period, and display data for a scanning line is written in the display data RAM. For example, in the scanning period for the first scanning line, display data for the first scanning line is transferred during the dummy horizontal blanking period of the first scanning line. In this case, in the frame, writing is always performed before reading as far as each scanning line is concerned. Therefore, one frame can be display-driven without considering the timings.

3.2 Operation Timing

Figure 16:
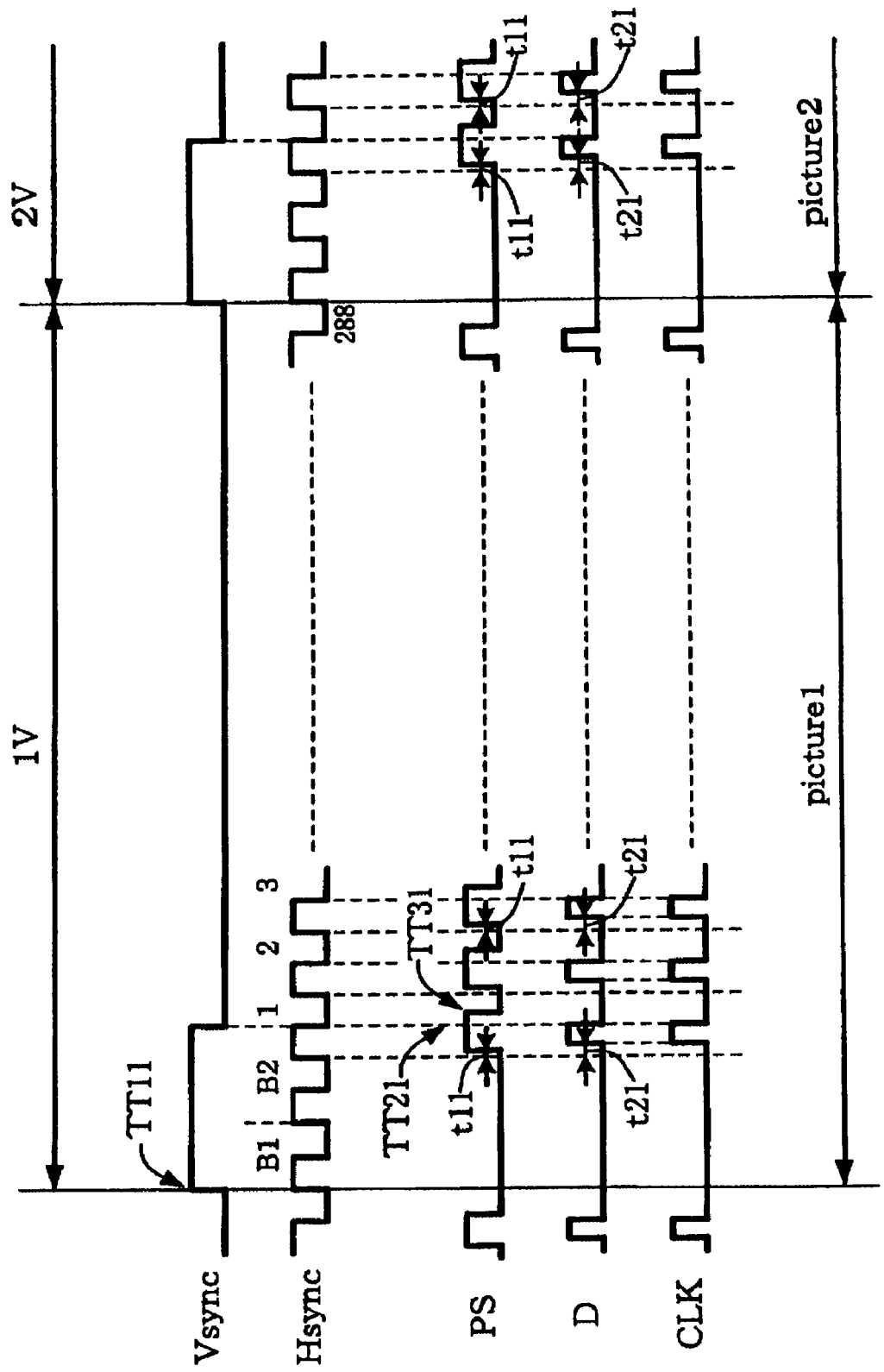
FIG. 16 is a timing chart of one example of operation timings where display data is transferred to the display controller of the second embodiment at 60 f/s.

FIG. 16 is a timing chart that shows one example of operation timings in the case of transferring display data to the display controller through the differential IF at 60 f/s in accordance with the second embodiment.

Here, one vertical scanning period is formed of for example, 288 horizontal scanning periods, and vertical blanking periods B1 and B2. In other words, a vertical blanking period is provided for a period corresponding to two horizontal scanning periods.

Descriptions are provided below assuming that the third structure example shown in FIGS. 9(A) and (B) is applied as a differential IF, but the same applies to the first and the second structure examples.

In order to notify the internally generated display timings to the MPU that is on the display data supply side, the display controller outputs a vertical synchronizing signal Vsync and a horizontal synchronizing signal Hsync.

Upon detecting a rise of the vertical synchronizing signal Vsync and a rise of the horizontal synchronizing signal (at time TT11), and detecting a rise of the horizontal synchronizing signal Hsync in the dummy horizontal blanking period B2, the MPU notifies to the display controller a time t11 later than the time TT11 (t11≦1H) to start the operation of the differential IF with the power control signal PS. From this moment on and during a period in which the logical level of the power control signal PS is at "H", the differential IF circuit of the MPU and the differential IF circuit of the display controller are operated, and a steady current flows.

Where a time t21 (t11≦t21≦1H) elapses since the time TT11, the MPU starts transferring the data signal D and clock signal CLK with the differential IF, and transfers display data for the first scanning line at a high-speed transfer rate, for example, at 100 Mbps–400 Mbps, until time TT21.

In other words, during the dummy horizontal blanking period, transfer of display data for one scanning line is started. The MPU recognizes the transfer data amount for display data for one scanning line, and therefore knows a transfer time TL to transfer display data for one scanning line based on the relation with respect to a pre-set transfer rate. Thus, the MPU sets the logical level of the power control signal PS at "H" for the transfer time TL to transfer the display data for at least one scanning line.

As a result, where the transfer of the display data for the scanning line is completed, the logical level of the power control signal PS becomes "L" at time TT31 (TT21≦TT31), such that the operation of the differential IF is stopped. From this moment on, and during a period in which the logical level of the power control signal PS is at "L", the differential IF circuit of the MPU and the differential IF circuit of the display controller stop their operation, and the current consumption becomes zero.

Meanwhile, in synchronism with a fall of the vertical synchronizing signal Vsync in the vertical scanning period 1V, the display controller reads, in the horizontal scanning period 1H, from the display data RAM, the display data for the frame that was written during the dummy horizontal blanking period, to thereby drive the liquid crystal panel as described above.

Similarly, in the succeeding horizontal scanning periods 2H, 3H, . . . , the transfer control of display data is performed in a unit of a scanning line, using each horizontal blanking period. In this manner, in the vertical scanning period 1V, the display for one frame (to display picture 1).

In the case of the frame cycle being 60 Hz, where the vertical synchronizing signal Vsync rises in the next vertical scanning period 2V, the transfer control of display data in a unit of a scanning line for the second frame is performed in the same manner as that for the vertical scanning period 1V, and the display data written during each of the dummy horizontal blanking periods in the vertical scanning period 2V is read out, and the liquid crystal panel is driven as described above. In the vertical scanning period 2V, display for the next one frame is performed (to display picture 2).

In this manner, in the differential IF, while display data for each of the scanning lines is being transferred, a steady current flows, and the operation of the differential IF is stopped at completion of the transfer. As a result, the current consumption occurring with the transfer of display data for of the horizontal scanning periods is only a steady current of the differential IF from time t11 to TT31. Accordingly, this can lower the current consumption, compared to the case of the IF with CMOS circuit, as indicated in FIG. 10. This would become more effective when the amount of display data to be transferred increases.

Figure 17:
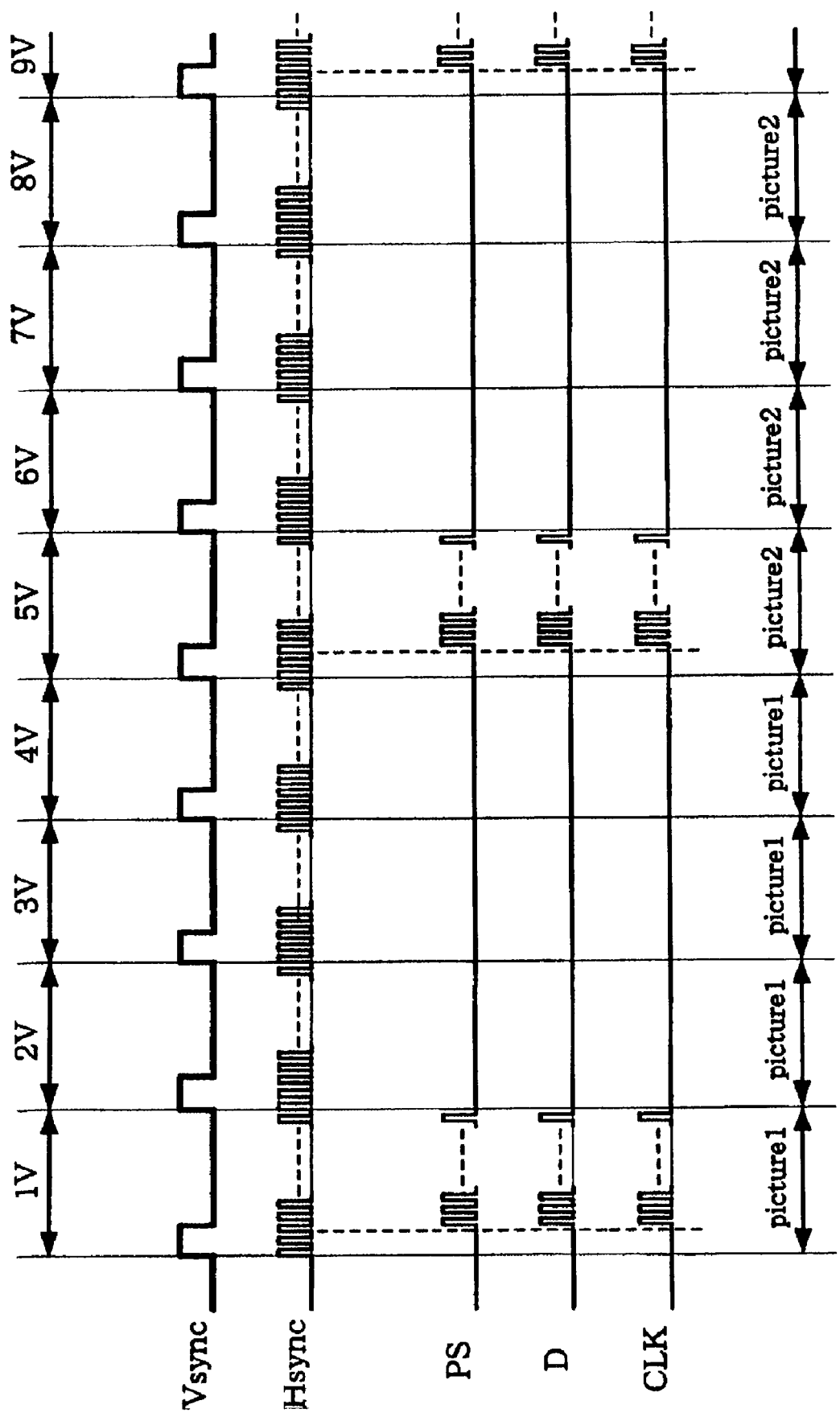
FIG. 17 is a timing chart of one example of operation timings where display data is transferred to the display controller of the first embodiment at 15 f/s.

FIG. 17 is a timing chart that shows one example of operation timings in the case of transferring display data to the display controller through the differential IF at 16 f/s in accordance with the second embodiment.

In this case also, the transfer control of the display data is conducted in a similar manner as that employed for 60 f/s indicated in FIG. 16.

Where the display controller display-drives the liquid crystal panel at a frame cycle of 60 Hz, the display driving is conducted based on the same display data for consecutive four frames. Therefore, display data is transferred for each of the scanning lines in the first frame as indicated in FIG. 16, and the next display data may be transferred in the fourth frame, skipping three frames. Therefore, the stopping period of the differential IF becomes longer, and therefore the current consumption can be further lowered.

It is noted that the present invention is not limited to the embodiments described above, and many modifications can be made within the scope of the subject matter of the present invention.

Also, referring to FIG. 3, the description is provided such that the bit width K of the differential IF is one bit. However, the present invention is not limited to this. Where the bit width K of the differential IF is two bits or greater, the transfer time to transfer display data that is required to display moving pictures can be further shortened. Therefore, the transfer controls described above would accommodate increases in the picture size and also contribute to further reductions in the power consumption.

What is claimed is:

1. A liquid crystal display (LCD) controller that display-drives a LCD display section based on display data, the LCD display controller comprising:
    a storage device that stores display data for at least one frame;
    a first display data receiving device that receives display data to be written in the storage device during a dummy blanking period provided prior to a start of scanning at the display section;
    a display data writing device that writes the display data received by the first display data receiving device in the storage device during the dummy blanking period; and
    a LCD display driving device that display-drives the LCD display section based on the display data read from the storage device, the dummy blanking period being provided before a vertical scanning in the display section starts, and the first display data receiving device receiving display data for one frame for the frame during the dummy blanking period where an amount of display data for one frame is defined as D, and a transfer data rate of display data to be received by the first display data receiving device is defined as R, the dummy blanking period being provided only for a period that is represented by D/R.

2. The LCD controller according to claim 1, the display data writing device writing display data corresponding to a given scanning line in the storage device, before the display data corresponding to a given scanning line in the frame is read from the storage device.

3. The LCD controller according to claim 1, the dummy blanking period being provided before a horizontal scanning in the LCD display section starts, and the first display data receiving device receiving display data for the scanning line during the dummy blanking period.

4. The LCD controller according to any one of claim 1, further including a receiving operation stopping device that stops an operation of the first display data receiving device during a given period from a completion of reception of display data by the first display data receiving device until the next display data is received.

5. The LCD controller according to claim 4, the first display data receiving device including a differential amplifier that amplifies a differential signal of display data received through signal lines of a differential pair, and the receiving operation stopping device stopping an operation of the differential amplifier during a period after display data received by the first display data receiving device is written in the storage device until the next display data is received.

6. A display unit, comprising:
    a plurality of first electrodes;
    a plurality of second electrodes;
    a panel with electrooptical elements that are driven by the plurality of first electrodes and the plurality of second electrodes;
    the LCD controller set forth in claim 7 that drives the plurality of first electrodes;
    a scan driving driver that scan-drives the plurality of second electrodes; and a display data supply circuit that supplies the display data to the LCD controller.

7. The display unit according to claim 6, the display data supply circuit including:
    a current supply source;
    a differential driver that, when a current supplied from the current supply source has a change based on display data, supplies a differential signal corresponding to the change to the LCD controller; and a differential driver control device that performs a differential control of the current source, such that, during a period after display data is supplied to the LCD controller until the next display data is supplied, the receiving operation stopping device stops or limits a current of a current source of the differential amplifier, and the differential driver control device stops or limits a current of the current source.

8. The LCD controller according to claim 4, the first display data receiving device including a differential amplifier that amplifies a differential signal of display data received through signal lines of a differential pair, and the receiving operation stopping device stopping or limiting a current of a current source of the differential amplifier during a period after display data received by the first display data receiving device is written in the storage device until the next display data is received.

9. A display unit, comprising:

a plurality of first electrodes;

a plurality of second electrodes;

a panel with electrooptical elements that are driven by the plurality of first electrodes and the plurality of second electrodes;

the LCD controller set forth in claim 1 that drives the plurality of first electrodes; and a scan driving driver that scan-drives the plurality of second electrodes.

10. An electronic apparatus, comprising:

the display unit according to claim 9.

* * * * *